United States Patent
Zhao

(10) Patent No.: US 11,657,718 B2
(45) Date of Patent: May 23, 2023

(54) METHOD FOR CONTROLLING VEHICLE PLATOON, DEVICE, AND INTERNET OF VEHICLES SYSTEM

(71) Applicant: Huawei Cloud Computing Technologies Co., Ltd., Guizhou (CN)

(72) Inventor: Can Zhao, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 183 days.

(21) Appl. No.: 16/682,376

(22) Filed: Nov. 13, 2019

(65) Prior Publication Data

US 2020/0082727 A1 Mar. 12, 2020

Related U.S. Application Data

(63) Continuation of application No. PCT/CN2018/086493, filed on May 11, 2018.

(30) Foreign Application Priority Data

May 15, 2017 (CN) .......................... 201710340834.0

(51) Int. Cl.
*G08G 1/00* (2006.01)
*G05D 1/02* (2020.01)
(Continued)

(52) U.S. Cl.
CPC .............. *G08G 1/22* (2013.01); *G05D 1/0293* (2013.01); *G05D 1/0295* (2013.01);
(Continued)

(58) Field of Classification Search
CPC .... G08G 1/20; G08G 1/207; G08G 1/22; G08G 1/0116; G08G 1/096791;
(Continued)

(56) References Cited

U.S. PATENT DOCUMENTS

| 3,215,219 A | 11/1965 | Forsyth et al. |
| 5,777,451 A * | 7/1998 | Kobayashi ........... G05D 1/0293 |
| | | 318/587 |

(Continued)

FOREIGN PATENT DOCUMENTS

| CN | 101615341 A | 12/2009 |
| CN | 102906654 A | 1/2013 |

(Continued)

OTHER PUBLICATIONS

Machine Translation and Abstract of Chinese Publication No. CN101615341, Dec. 30, 2009, 14 pages.
(Continued)

*Primary Examiner* — Yazan A Soofi
(74) *Attorney, Agent, or Firm* — Conley Rose, P.C.

(57) ABSTRACT

A method for controlling a vehicle platoon includes determining whether a vehicle platoon is capable of safely passing through a weight-limited road section, generating segment information of the vehicle platoon when the vehicle platoon is incapable of safely passing through the weight-limited road section, and sending this information to a lead vehicle in the vehicle platoon. The lead vehicle can then segment the vehicle platoon based on the segment information.

20 Claims, 9 Drawing Sheets

(51) Int. Cl.
*G06V 20/58* (2022.01)
*G08G 1/01* (2006.01)
*G08G 1/0967* (2006.01)
*H04L 65/40* (2022.01)
*H04L 67/12* (2022.01)

(52) U.S. Cl.
CPC ......... *G06V 20/584* (2022.01); *G08G 1/0116* (2013.01); *G08G 1/096791* (2013.01); *G05D 2201/0213* (2013.01)

(58) Field of Classification Search
CPC .. G08G 1/0293; G08G 1/0967; G05D 1/0287; G05D 1/0293; G05D 1/0295; G05D 1/0297; G05D 1/0027; G05D 1/0214; G05D 2201/0213; G06K 9/00825; H04L 29/08; H04L 67/12; G01G 19/02; G01G 19/03; G01C 21/3461
See application file for complete search history.

(56) References Cited

U.S. PATENT DOCUMENTS

| | | | | |
|---|---|---|---|---|
| 6,032,097 | A * | 2/2000 | Iihoshi | G08G 1/22 340/436 |
| 6,356,820 | B1 * | 3/2002 | Hashimoto | G06Q 10/06311 |
| 9,182,764 | B1 * | 11/2015 | Kolhouse | B60W 30/00 |
| 9,940,840 | B1 * | 4/2018 | Schubert | G01C 21/3407 |
| 2006/0202811 | A1 * | 9/2006 | Taguchi | B60C 23/0401 701/31.4 |
| 2010/0114437 | A1 * | 5/2010 | Boss | B60K 28/08 701/48 |
| 2011/0270513 | A1 | 11/2011 | Shida | |
| 2013/0124077 | A1 * | 5/2013 | Kim | B60R 16/0236 701/123 |
| 2013/0211624 | A1 | 8/2013 | Lind et al. | |
| 2014/0100734 | A1 * | 4/2014 | Yamashiro | G08G 1/22 701/23 |
| 2014/0172265 | A1 * | 6/2014 | Funabashi | G08G 1/22 701/96 |
| 2014/0316671 | A1 * | 10/2014 | Okamoto | G08G 1/22 701/96 |
| 2014/0316865 | A1 | 10/2014 | Okamoto | |
| 2015/0269845 | A1 | 9/2015 | Calmettes et al. | |
| 2015/0336581 | A1 * | 11/2015 | Slaton | B60W 30/14 701/93 |
| 2016/0019782 | A1 * | 1/2016 | Alam | B60W 30/18163 340/905 |
| 2016/0054735 | A1 | 2/2016 | Switkes et al. | |
| 2016/0171894 | A1 | 6/2016 | Harvey | |
| 2016/0304080 | A1 * | 10/2016 | Sugiyama | B60W 30/16 |
| 2016/0362048 | A1 * | 12/2016 | Matthews | G08G 1/163 |
| 2017/0270785 | A1 * | 9/2017 | Umehara | G08G 1/08 |
| 2018/0018605 | A1 * | 1/2018 | Light-Holets | G06Q 10/06311 |
| 2018/0176750 | A1 * | 6/2018 | Xu | H04W 4/46 |
| 2018/0188744 | A1 * | 7/2018 | Switkes | G05D 1/02 |
| 2018/0190119 | A1 * | 7/2018 | Miller, Jr. | G08G 1/166 |
| 2018/0211546 | A1 * | 7/2018 | Smartt | H04W 4/46 |

FOREIGN PATENT DOCUMENTS

| | | | | |
|---|---|---|---|---|
| CN | 103403639 | A | | 11/2013 |
| CN | 102508638 | B | | 9/2014 |
| CN | 104050555 | A | | 9/2014 |
| CN | 204155310 | U | | 2/2015 |
| CN | 105651297 | A | | 6/2016 |
| CN | 105758418 | A | | 7/2016 |
| DE | 102012212339 | A1 | | 1/2014 |
| EP | 2390744 | A1 | | 11/2011 |
| EP | 3200169 | A1 * | 8/2017 | ............ B60W 30/16 |
| JP | 2010244346 | A | | 10/2010 |
| JP | 5071396 | B2 | | 11/2012 |
| JP | 5195929 | B2 | | 5/2013 |
| WO | 2012105889 | A1 | | 8/2012 |
| WO | 2015047174 | A1 | | 4/2015 |
| WO | WO-2016163929 | A1 * | 10/2016 | .......... B60W 30/165 |
| WO | WO-2018111177 | A1 * | 6/2018 | .......... B60W 30/165 |

OTHER PUBLICATIONS

Machine Translation and Abstract of Chinese Publication No. CN102508638, Sep. 17, 2014, 27 pages.
Machine Translation and Abstract of Chinese Publication No. CN105651297, Jun. 8, 2016, 12 pages.
Machine Translation and Abstract of Chinese Publication No. CN105758418, Jul. 13, 2016, 18 pages.
Machine Translation and Abstract of Chinese Publication No. CN204155310, Feb. 11, 2015, 35 pages.
Machine Translation and Abstract of German Publication No. DE102012212339, Jan. 16, 2014, 10 pages.
Machine Translation and Abstract of Japanese Publication No. JP5071396, Nov. 14, 2012, 28 pages.
Machine Translation and Abstract of Japanese Publication No. JP2010244346, Oct. 28, 2010, 28 pages.
"3rd Generation Partnership Project; Technical Specification Group Services and System Aspects; Study on enhancement of 3GPP Support for 5G V2X Services (Release 15)," 3GPP TR 22.886, V15.1 0, Mar. 2017, 58 pages.
XP055681913, David Bevly, "Heavy Truck Cooperative Adaptive Cruise Control: Evaluation, Testing, and Stakeholder Engagement for Near Term Deployment: Phase One Final Report," American Transportation Research Institute, Apr. 30, 2015,135 pages.

* cited by examiner

METHOD FOR CONTROLLING VEHICLE PLATOON, DEVICE, AND INTERNET OF VEHICLES SYSTEM

CROSS-REFERENCE TO RELATED APPLICATIONS

This application is a continuation of International Patent Application No. PCT/CN2018/086493 filed on May 11, 2018, which claims priority to Chinese Patent Application No. 201710340834.0 filed on May 15, 2017. The disclosures of the aforementioned applications are hereby incorporated by reference in their entireties.

TECHNICAL FIELD

This application relates to the internet of vehicles field, and in particular, to a method for controlling a vehicle platoon, a device, and an internet of vehicles system.

BACKGROUND

Vehicle platooning is an important application in an internet of vehicles. As shown in FIG. 1, vehicle platooning means that vehicle fleets equipped with intelligent sensor devices and short-range communications devices form a platoon. A lead vehicle (also referred to as LV) is controlled by a driver, and controls, using a vehicle to vehicle (V2V) communications technology, a following vehicle (also referred to as FV) behind the lead vehicle in the vehicle platoon to follow a motion trail of the lead vehicle. In this way, a plurality of vehicles travels automatically in a platoon. The lead vehicle controls the following vehicle using a V2V technology, and the following vehicle in the vehicle platoon can be synchronized with driving behavior of the lead vehicle with nearly no reaction time.

With the popularization of a vehicle platooning application, a scenario in which heavily loaded trucks travel in a short-distance platoon may occur. It is found that when a vehicle platoon of these heavily loaded trucks passes through a weight-limited road section (such as a bridge), it is very likely that overall load of the weight-limited road section is exceeded, causing serious damage to the weight-limited road section, accelerating damage and aging of the weight-limited road section, and increasing maintenance costs of the weight-limited road section. In an extreme case, the weight-limited road section may even collapse, causing severe casualties and economic losses. This risk is not considered in other approaches, and no corresponding solution is proposed.

Therefore, how to ensure that the vehicle platoon safely passes through the weight-limited road section becomes a technical problem that needs to be resolved.

SUMMARY

This application provides a method for controlling a vehicle platoon, a device, and an internet of vehicles system to ensure that the vehicle platoon safely passes through a weight-limited road section.

According to a first aspect, a method for controlling a vehicle platoon is provided. The method is performed by roadside equipment (RSE), a control center, or a lead vehicle in the vehicle platoon. The method includes determining whether the vehicle platoon is capable of safely passing through a weight-limited road section, and determining segment information of the vehicle platoon when the vehicle platoon is incapable of safely passing through the weight-limited road section, where the segment information includes an identifier of at least one sub lead vehicle and a distance between each sub lead vehicle and a previous following vehicle, each sub lead vehicle is the first following vehicle at a segment of the vehicle platoon, and each sub lead vehicle controls travelling of a following vehicle in the segment.

In an embodiment of the present disclosure, whether the vehicle platoon is capable of safely passing through the weight-limited road section is predetermined, and if the vehicle platoon is incapable of safely passing through the weight-limited road section, the segment information of the vehicle platoon is determined, and the lead vehicle can segment the vehicle platoon based on the segment information such that the vehicle platoon is capable of safely passing through the weight-limited road section.

In some possible implementations, before determining whether the vehicle platoon is capable of safely passing through a weight-limited road section, the method further includes obtaining vehicle platoon information of the vehicle platoon, where the vehicle platoon information includes a travelling route, a speed, a location, and a vehicle spacing of the vehicle platoon, and a weight and a length of each vehicle in the vehicle platoon, obtaining information about another vehicle within a preset distance of the vehicle platoon, where the information about the other vehicle includes a speed, a location, and a weight of the other vehicle, and obtaining information about the weight-limited road section, where the information about the weight-limited road section includes a length and load of the weight-limited road section, and determining segment information of the vehicle platoon when the vehicle platoon is incapable of safely passing through the weight-limited road section includes determining the segment information based on the vehicle platoon information, the information about the other vehicle, and the information about the weight-limited road section.

In this embodiment of the present disclosure, the segment information of the vehicle platoon is determined based on the foregoing information such that the vehicle platoon is capable of safely passing through the weight-limited road section after being segmented based on the segment information.

It should be noted that the other vehicle within the preset distance of the vehicle platoon includes a vehicle whose distance from the vehicle platoon is less than or equal to the preset distance and that does not belong to the vehicle platoon.

In some possible implementations, the method is performed by the control center, the RSE, or the lead vehicle in the vehicle platoon. The obtaining information about another vehicle within a preset distance of the vehicle platoon includes receiving the information about the other vehicle within the preset distance of the vehicle platoon.

In some possible implementations, the method is performed by the control center or the lead vehicle in the vehicle platoon. Before determining whether the vehicle platoon is capable of safely passing through a weight-limited road section, the method further includes receiving indication information sent by the RSE, where the indication information is used to indicate that an internet of vehicles has covered all vehicles on a road.

In some possible implementations, the method is performed by the RSE. Obtaining information about another vehicle within a preset distance of the vehicle platoon includes collecting an image of the other vehicle within the preset distance of the vehicle platoon, and determining the information about the other vehicle based on the collected image.

In some possible implementations, the method is performed by the RSE. Before determining whether the vehicle platoon is capable of safely passing through a weight-limited road section, the method further includes determining that an internet of vehicles has not covered all vehicles on a road.

In some possible implementations, determining that an internet of vehicles has not covered all vehicles on a road includes collecting an image of a neighborhood, determining first vehicle information of a neighboring vehicle based on the image, where the first vehicle information includes at least one of vehicle location information and vehicle model information, receiving second vehicle information sent by the neighboring vehicle, where the second vehicle information includes at least one of vehicle location information and vehicle model information, comparing the first vehicle information with the second vehicle information, and if the first vehicle information is different from the second vehicle information, determining that the internet of vehicles has not covered all the vehicles on the road.

In some possible implementations, the method is performed by the RSE, the control center, or the lead vehicle in the vehicle platoon. Determining whether the vehicle platoon is capable of safely passing through a weight-limited road section includes determining, based on the vehicle platoon information, the information about the other vehicle, and the information about the weight-limited road section, whether the vehicle platoon is capable of safely passing through the weight-limited road section.

In some possible implementations, the method is performed by the RSE, the control center, or the lead vehicle in the vehicle platoon. Before determining whether the vehicle platoon is capable of safely passing through a weight-limited road section, the method further includes determining a condition of meeting weight limit prediction.

In some possible implementations, the condition includes that a distance between the vehicle platoon and the weight-limited road section is less than or equal to a preset distance, and that weight limit prediction has not been completed for the weight-limited road section.

In some possible implementations, the condition further includes having permission to perform weight limit prediction. This helps avoid a resource waste caused when the RSE and the control center repeatedly perform weight limit prediction.

In some possible implementations, the method is performed by the RSE or the control center, and the method further includes sending the segment information to the lead vehicle in the vehicle platoon.

According to a second aspect, a method for controlling a vehicle platoon is provided. The method is performed by a lead vehicle in the vehicle platoon. The method includes obtaining, by the lead vehicle in the vehicle platoon, segment information of the vehicle platoon, where the segment information includes an identifier of at least one sub lead vehicle and a distance between each of the at least one sub lead vehicle and a previous following vehicle, each sub lead vehicle is the first following vehicle at a segment of the vehicle platoon, and each sub lead vehicle controls travelling of a following vehicle in the segment, and segmenting, by the lead vehicle, the vehicle platoon based on the segment information, where after the vehicle platoon is segmented, the lead vehicle and the at least one sub lead vehicle control travelling of a remaining following vehicle in each segment of the vehicle platoon.

In this embodiment of the present disclosure, the lead vehicle in the vehicle platoon may segment the vehicle platoon based on the segment information of the vehicle platoon such that the vehicle platoon is capable of safely passing through the weight-limited road section.

In some possible implementations, segmenting, by the lead vehicle, the vehicle platoon based on the segment information includes sending, by the lead vehicle, a notification message to the at least one sub lead vehicle based on the segment information, where the notification message includes indication information used to indicate that a control right is granted to the at least one sub lead vehicle and indicate a distance between each of the at least one sub lead vehicle and a previous following vehicle. Optionally, the notification message may further include an identifier of a following vehicle controlled by the at least one sub lead vehicle.

In some possible implementations, the method further includes sending, by the lead vehicle to at least one following vehicle controlled by the at least one sub lead vehicle, an identifier of a sub lead vehicle in a segment in which the at least one following vehicle is located.

In some possible implementations, the method further includes receiving, by the lead vehicle, a combination request sent by the at least one sub lead vehicle, where the combination request is used to request the lead vehicle to re-control the at least one sub lead vehicle and a following vehicle controlled by the at least one sub lead vehicle, and canceling, by the lead vehicle, the control right of the at least one sub lead vehicle based on the combination request, and re-controlling the at least one sub lead vehicle and the following vehicle controlled by the at least one sub lead vehicle.

In some possible implementations, the obtaining, by the lead vehicle in the vehicle platoon, segment information of the vehicle platoon includes receiving, by the lead vehicle, the segment information sent by RSE or a control center, or obtaining the segment information from a memory.

Further, if the segment information of the vehicle platoon is determined by the RSE or the control center, the lead vehicle receives the segment information sent by the RSE or the control center. Alternatively, if the segment information of the vehicle platoon is determined by the lead vehicle in the vehicle platoon, the lead vehicle obtains the segment information from a memory of the lead vehicle.

In some possible implementations, the method further includes sending, by the lead vehicle, vehicle platoon information to the RSE or the control center, where the vehicle platoon information includes a speed, a location, and a vehicle spacing of the vehicle platoon.

In some possible implementations, the vehicle platoon information further includes a travelling route of the vehicle platoon, and a weight and a length of each vehicle in the vehicle platoon.

According to a third aspect, a method for controlling a vehicle platoon is provided. The method is performed by a following vehicle in the vehicle platoon. The method includes receiving, by the following vehicle in the vehicle platoon, a notification message sent by a lead vehicle in the vehicle platoon, where the notification message includes indication information used to indicate that a control right is granted to a sub lead vehicle and indicate a distance between the sub lead vehicle and a previous following vehicle, and the sub lead vehicle is the first following vehicle at a segment of the vehicle platoon, and controlling, based on the notification message by the following vehicle acting as the sub lead vehicle, travelling of a following vehicle in a segment in which the sub lead vehicle is located, and keeping the distance from the previous following vehicle in the vehicle platoon.

In this embodiment of the present disclosure, the sub lead vehicle in the vehicle platoon may keep a distance from the previous following vehicle, and control travelling of the following vehicle in the segment in which the sub lead vehicle is located such that the vehicle platoon is capable of safely passing through a weight-limited road section.

In some possible implementations, the method further includes determining, by the following vehicle, whether the weight-limited road section is passed through, and sending, by the following vehicle, a combination request to the lead vehicle when determining that the weight-limited road section has been passed through, where the combination request is used to request the lead vehicle to re-control the sub lead vehicle and a following vehicle controlled by the sub lead vehicle.

According to a fourth aspect, a control device is provided. The control device is configured to implement the method according to any one of the first aspect or the possible implementations of the first aspect.

Further, the control device may include units configured to perform the method according to any one of the first aspect or the possible implementations of the first aspect.

According to a fifth aspect, an on-board terminal is provided. The on-board terminal is configured to implement the method according to any one of the second aspect or the foregoing possible implementations of the second aspect.

Further, the on-board terminal may include units configured to perform the method according to any one of the second aspect or the possible implementations of the second aspect.

According to a sixth aspect, an on-board terminal is provided. The on-board terminal is configured to implement the method according to any one of the third aspect or the foregoing possible implementations of the third aspect.

Further, the on-board terminal may include units configured to perform the method according to any one of the third aspect or the possible implementations of the third aspect.

According to a seventh aspect, a control device is provided, including a processor, a transceiver, and a memory. The processor, the transceiver, and the memory communicate with each other using an internal connection path. The memory is configured to store an instruction. The processor is configured to execute the instruction stored in the memory, and execution of the instruction stored in the memory enables the control device to perform the method according to any one of the first aspect or the possible implementations of the first aspect.

According to an eighth aspect, an on-board terminal is provided, including a processor, a transceiver, and a memory. The processor, the transceiver, and the memory communicate with each other using an internal connection path. The memory is configured to store an instruction. The processor is configured to execute the instruction stored in the memory, and execution of the instruction stored in the memory enables the on-board terminal to perform the method according to any one of the second aspect or the possible implementations of the second aspect.

According to a ninth aspect, an on-board terminal is provided, including a processor, a transceiver, and a memory. The processor, the transceiver, and the memory communicate with each other using an internal connection path. The memory is configured to store an instruction. The processor is configured to execute the instruction stored in the memory, and execution of the instruction stored in the memory enables the on-board terminal to perform the method according to any one of the third aspect or the possible implementations of the third aspect.

According to a tenth aspect, a computer-readable storage medium is provided. The computer-readable storage medium stores a program, and the program enables a control device to perform the method according to any one of the first aspect or the possible implementations of the first aspect.

According to an eleventh aspect, a computer-readable storage medium is provided. The computer-readable storage medium stores a program, and the program enables an on-board terminal to perform the method according to any one of the second aspect or the possible implementations of the second aspect.

According to a twelfth aspect, a computer-readable storage medium is provided. The computer-readable storage medium stores a program, and the program enables an on-board terminal to perform the method according to any one of the third aspect or the possible implementations of the third aspect.

DESCRIPTION OF EMBODIMENTS

The following describes technical solutions of this application with reference to accompanying drawings.

Embodiments of the present disclosure are mainly applied to an intelligent transportation system (ITS) communication scenario, and relate to communication between various ITS communications nodes on different platforms, such as a vehicle, RSE, a handheld device, and a control center. Communications technologies used in the ITS communication scenario include but are not limited to an ITS-G5, infrared (IR) communication, a dedicated short range communications (DSRC) technology, WI-FI, a cellular technology, and an internet technology. Devices in an internet of vehicles may exchange information, and use the information to make a decision through comprehensive analyzing, thereby improving traffic safety and traffic efficiency, and saving energy. Platooning is an application instance in the ITS system.

Communications nodes in the embodiments of the present disclosure include the vehicle, the RSE, and the control center. In the platooning application, vehicles may be further divided into a lead vehicle, a following vehicle, and another vehicle. In addition, a concept of a sub lead vehicle is further introduced in the embodiments of the present disclosure. The following describes terminologies used in the embodiments of the present disclosure.

Vehicle: The vehicle is equipped with a sensor device, may collect information about a speed, a location, a configuration, and an identity of the vehicle, and may also perceive ambient information. The vehicle may support interaction with RSE and a neighboring vehicle through near field communication, and can establish a connection to a control center through long-range communication or using the RSE.

Figure 1:
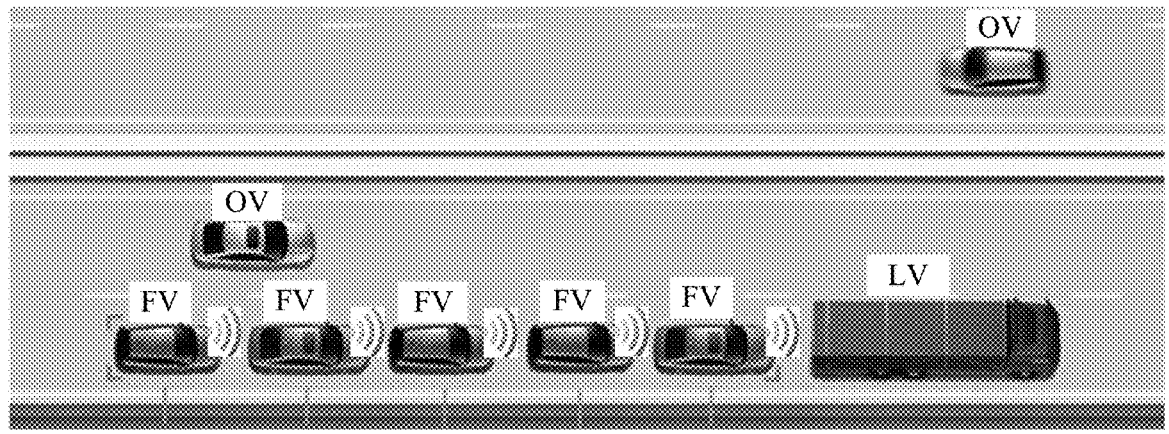
FIG. 1 is a schematic diagram of vehicle platooning.

Lead vehicle (LV): The lead vehicle is a vehicle that is foremost in the vehicle platoon during platooning, as shown in FIG. 1. The lead vehicle is controlled by a driver, and may control travelling of another vehicle in the vehicle platoon through V2V communication.

Following vehicle (FV): The following vehicle is a vehicle other than the lead vehicle during platooning, as shown in FIG. 1. During platooning, travelling of the following vehicle is controlled by the lead vehicle.

Other vehicle (OV): The other vehicle is a vehicle outside of the vehicle platoon, as shown in FIG. 1.

Figure 2:
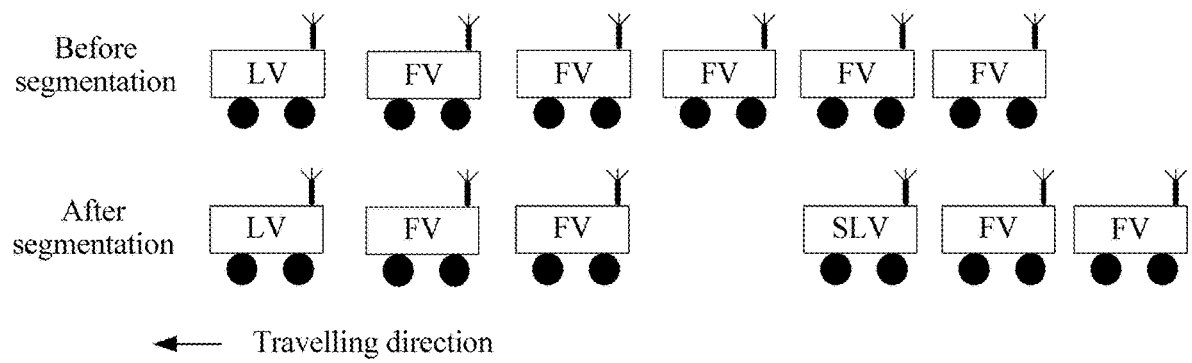
FIG. 2 is a schematic diagram of vehicle platooning according to an embodiment of the present disclosure.

Sub lead vehicle (SLV): The sub lead vehicle is the first vehicle at a segment after the vehicle platoon is segmented during platooning, as shown in FIG. 2. The sub lead vehicle temporarily functions as the lead vehicle to control travelling a vehicle in the segment.

Roadside equipment (RSE): The RSE may collect data of a vehicle in a communication distance range through V2V communication, and may also obtain vehicle information using a sensor device, for example, may obtain an image of a neighborhood using an image collection device and obtain the vehicle information by analyzing the image. The RSE further supports information exchange with the control center, and has an edge computing capability and a decision-making capability.

Control center: The control center collects and analyzes data of the vehicle and the RSE, delivers a decision to the vehicle and the RSE, and controls traveling of the vehicle and processing of the RSE.

To ensure that a vehicle platoon is capable of safely passing through a weight-limited road section, the embodiments of the present disclosure propose a method for controlling the vehicle platoon. Whether the vehicle platoon is capable of safely passing through the weight-limited road section is predetermined, and if the vehicle platoon is incapable of safely passing through the weight-limited road section, the vehicle platoon is notified to be segmented such that the vehicle platoon safely passes through the weight-limited road section after being segmented.

Figure 3:
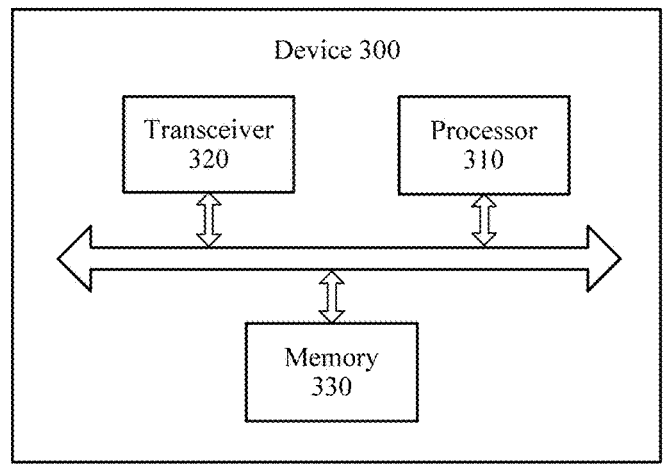
FIG. 3 is a schematic structural diagram of a device according to an embodiment of the present disclosure.

FIG. 3 is a block diagram of a partial structure of a device 300 according to an embodiment of the present disclosure. The device 300 shown in FIG. 3 may be a control device or an on-board terminal in the embodiments of the present disclosure. The on-board terminal may be applied to a lead vehicle or a following vehicle in a vehicle platoon. As shown in FIG. 3, the device 300 may include a processor 310, a transceiver 320, and a memory 330.

The processor 310 includes one or more processing cores. The processor 310 runs a software program to perform various function applications and process data.

The transceiver 320 may be configured to communicate with another device.

The memory 330 is connected to the processor 310. The memory 330 may be configured to store the software program.

The memory 330 may be implemented by any type of volatile or non-volatile storage device or a combination thereof, for example, a static random access memory (SRAM), an electrically erasable programmable read-only memory (EEPROM), an erasable programmable read only memory (EPROM), a programmable read only memory (PROM), a read-only memory (ROM), a magnetic memory, a flash memory, a magnetic disk, or an optical disc.

A person skilled in the art may understand that the structure of the device 300 shown in FIG. 3 constitutes no limitation on the control device or the on-board terminal, and may include more or fewer parts than those shown in the figure, or combine some parts, or have different part arrangements.

Figure 4:
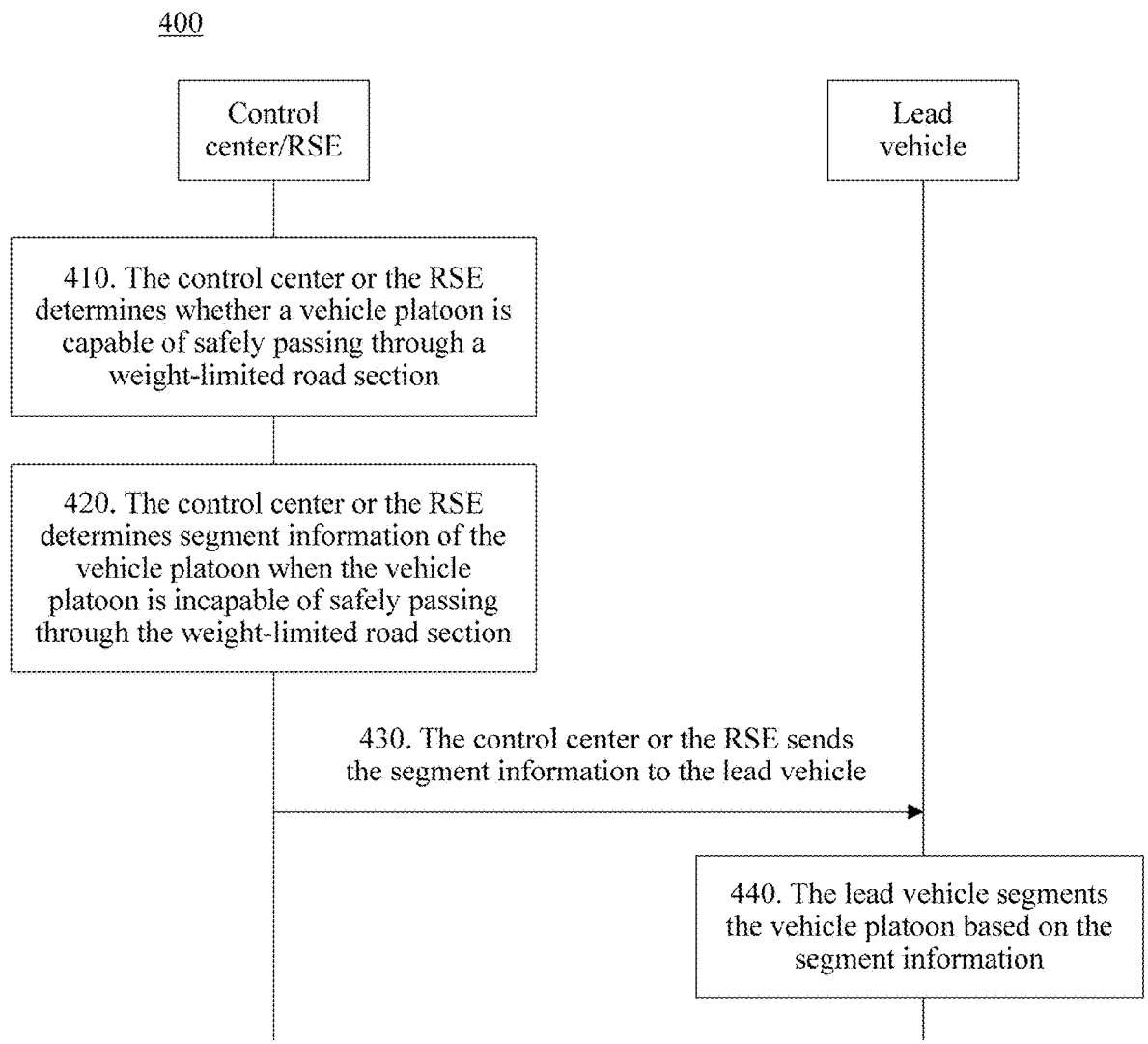
FIG. 4 is a schematic flowchart of a method for controlling a vehicle platoon according to an embodiment of the present disclosure.

FIG. 4 is a schematic flowchart of a method 400 for controlling a vehicle platoon according to an embodiment of the present disclosure. As shown in FIG. 4, the method 400 includes the following content.

Step 410. A control center or RSE determines whether a vehicle platoon is capable of safely passing through a weight-limited road section.

Step 420. The control center or the RSE determines segment information of the vehicle platoon when the vehicle platoon is incapable of safely passing through the weight-limited road section, where the segment information includes an identifier of at least one sub lead vehicle and a distance between each of the at least one sub lead vehicle and a previous following vehicle, each sub lead vehicle is the first following vehicle at a segment of the vehicle platoon, and each sub lead vehicle controls travelling of a following vehicle in the segment.

Step 430. The control center or the RSE sends the segment information to a lead vehicle.

Correspondingly, the lead vehicle receives the segment information.

It should be noted that, during initial deployment of an internet of vehicles, the internet of vehicles has not covered all vehicles on a road, and there are a relatively small quantity of vehicles with a communication capability, that is, some vehicles do not have a capability of exchanging information with the control center or the RSE. In this case, step 410 to step 430 in the method shown in FIG. 4 may be performed by the RSE.

After the internet of vehicles is fully deployed, the internet of vehicles covers all the vehicles on the road, and all the vehicles on the road have the capability of exchanging information with the control center or the RSE. In this case, step 410 to step 430 in the method shown in FIG. 4 may be performed by the control center or the RSE.

Step 440. After receiving the segment information sent by the control center or the RSE, the lead vehicle segments the vehicle platoon based on the segment information, and after the vehicle platoon is segmented, the lead vehicle and the at least one sub lead vehicle control travelling of a remaining following vehicle in each segment of the vehicle platoon.

Optionally, that the lead vehicle segments the vehicle platoon based on the segment information includes the lead vehicle sends a notification message to the at least one sub lead vehicle, where the notification message includes indication information used to indicate that a control right is granted to the at least one sub lead vehicle and indicate a distance between each of the at least one sub lead vehicle and a previous following vehicle. That is, the notification message is used to indicate that the control right is granted to the at least one sub lead vehicle, and notify the distance between each of the at least one sub lead vehicle and the previous following vehicle. Correspondingly, after receiving the notification message, each sub lead vehicle controls, based on the notification message, travelling of a following vehicle corresponding to each sub lead vehicle, and keeps a corresponding distance from the previous following vehicle.

Optionally, the notification message may further include an identifier of a following vehicle controlled by the at least one sub lead vehicle.

After passing through the weight-limited road section, each sub lead vehicle may send a combination request to the lead vehicle, to request the lead vehicle to re-control a vehicle in a segment in which each sub lead vehicle is located. After receiving the combination request, the lead vehicle may cancel the control right of the sub lead vehicle, and re-control travelling of the vehicle in the segment in which the sub lead vehicle is located. It should be noted that, after receiving a combination request from a sub lead vehicle, the lead vehicle may immediately cancel a control right of the sub lead vehicle, and re-control travelling of a vehicle in a segment in which the sub lead vehicle is located. In this way, after passing through the weight-limited road section in segments, the vehicle platoon is reintegrated and continues to travel.

In this embodiment of the present disclosure, whether the vehicle platoon is capable of safely passing through the weight-limited road section is predetermined, and if the vehicle platoon is incapable of safely passing through the weight-limited road section, the segment information of the vehicle platoon is sent to the lead vehicle in the vehicle platoon, and the lead vehicle segments the vehicle platoon based on the segment information such that the vehicle platoon is capable of safely passing through the weight-limited road section.

Optionally, before step 410, the method 400 may further include the control center or the RSE determines a condition of meeting weight limit prediction. The condition includes that a distance between the vehicle platoon and the weight-limited road section is less than or equal to a preset distance, and that weight limit prediction has not been completed for the weight-limited road section. That is, when the distance between the vehicle platoon and the weight-limited road section is less than or equal to the preset distance, and that weight limit prediction has not been completed for the weight-limited road section, the control center or the RSE determines whether the vehicle platoon is capable of safely passing through the weight-limited road section.

It should be noted that, in this embodiment of the present disclosure, when the distance between the vehicle platoon and the weight-limited road section is less than or equal to the preset distance, prediction is performed because in an extreme case, load of the weight-limited road section already equals or exceeds overall load, and the vehicle platoon cannot travel onto the weight-limited road section, and needs to stop before travelling onto the weight-limited road section. Therefore, the preset distance may be determined based on a maximum braking distance of the vehicle platoon. For example, a braking distance range of a truck traveling at a hundred kilometers (km) per hour is 100 meters (m) to 1000 m, and the maximum braking distance 1000 m may be set as the preset distance. Further, a more proper preset distance may be set by comprehensively considering weather, a road section, a vehicle speed, vehicle model information of the vehicle platoon, and the like.

It should be further noted that, if weight limit prediction has not been completed for the weight-limited road section, it indicates that whether the vehicle platoon is capable of safely passing through the weight-limited road section is not determined, and if weight limit prediction has been completed for the weight-limited road section, it indicates that whether the vehicle platoon is capable of safely passing through the weight-limited road section is determined. When weight limit prediction has not been completed for the weight-limited road section, whether the vehicle platoon is capable of safely passing through the weight-limited road section is determined. In this way, repeated execution of weight limit prediction for the weight-limited road section can be avoided such that a resource waste caused by the repeated execution of weight limit prediction for the weight-limited road section is avoided.

Optionally, the condition may further include having permission to perform weight limit prediction. For example, the control center or the RSE stores an identifier used to indicate that the control center or the RSE has permission to perform weight limit prediction. If the RSE and the control center repeatedly perform weight limit prediction, resources may be wasted. Therefore, permissions may be configured for the RSE or the control center in advance, and the RSE or the control center with permissions performs weight limit prediction such that the resource waste caused when the RSE and the control center repeatedly perform weight limit prediction is avoided.

Optionally, the method 400 may further include obtaining, by the control center or the RSE, vehicle platoon information of the vehicle platoon, where the vehicle platoon information includes a travelling route, a speed, a location, and a vehicle spacing of the vehicle platoon, and a weight and a length of each vehicle in the vehicle platoon, obtaining, by the control center or the RSE, information about another vehicle within a preset distance of the vehicle platoon, where the information about the other vehicle includes a speed, a location, and a weight of the other vehicle, and obtaining, by the control center or the RSE, information about the weight-limited road section, where the information about the weight-limited road section includes a length and load of the weight-limited road section.

Optionally, the vehicle platoon information may further include a vehicle platoon identifier, an LV identifier, and an FV identifier. Optionally, the vehicle platoon information may further include an acceleration of the vehicle platoon, and the information about the other vehicle may also include an acceleration of the other vehicle.

It should be understood that, in this embodiment of the present disclosure, the lead vehicle in the vehicle platoon may send the vehicle platoon information to the control center or the RSE. That is, the obtaining, by the control center or the RSE, vehicle platoon information of the vehicle platoon includes receiving, by the control center or the RSE, the vehicle platoon information sent by the lead vehicle in the vehicle platoon. It should be noted that the lead vehicle may report all vehicle platoon information, such as the travelling route, the speed, the location, and the vehicle spacing of the vehicle platoon, and the weight and the length of each vehicle in the vehicle platoon. Alternatively, the lead vehicle may report all vehicle platoon information at an initial stage, such as the travelling route, the speed, the location, and the vehicle spacing of the vehicle platoon, and the weight and the length of each vehicle in the vehicle platoon, and if some vehicle platoon information changes during traveling, the lead vehicle may further dynamically report the changed vehicle platoon information, such as a speed, a location, and a vehicle spacing of the vehicle platoon.

Correspondingly, that a control center or RSE determines whether a vehicle platoon is capable of safely passing through a weight-limited road section in step 410 includes the control center or the RSE determines, based on the vehicle platoon information, the information about the other vehicle, and the information about the weight-limited road section, whether the vehicle platoon is capable of safely passing through the weight-limited road section. That the control center or the RSE determines segment information of the vehicle platoon in step 420 includes the control center or the RSE determines the segment information of the vehicle platoon based on the vehicle platoon information, the information about the other vehicle, and the information about the weight-limited road section.

That is, the control center or the RSE may collect information related to the vehicle platoon, the other vehicle, and the weight-limited road section, and determine, based on the information, whether the vehicle platoon is capable of safely passing through the weight-limited road section. When the vehicle platoon is incapable of safely passing through the weight-limited road section, the control center or the RSE further determines the segment information of the vehicle platoon based on the information to ensure that the vehicle platoon safely passes through the weight-limited road section.

In some embodiments, the information about the weight-limited road section may be preconfigured in the control center or the RSE. That the control center or the RSE obtains information about the weight-limited road section includes the control center or the RSE obtains the information about the weight-limited road section from a memory.

In some embodiments, that the control center obtains information about the weight-limited road section may further include the control center receives the information about the weight-limited road section that is sent by the RSE.

In some embodiments, that the control center obtains information about another vehicle within a preset distance of the vehicle platoon includes the control center receives the information about the other vehicle within the preset distance of the vehicle platoon. In this embodiment of the present disclosure, each vehicle on the road has a capability of reporting information such as a speed, a location, and a weight of the vehicle to the control center.

In some embodiments, that the RSE obtains information about another vehicle within a preset distance of the vehicle platoon includes the RSE collects an image of the other vehicle within the preset distance of the vehicle platoon, and the RSE determines the information about the other vehicle based on the collected image. The RSE determines, based on vehicle information estimated through image analysis, whether the vehicle platoon is capable of safely passing through the weight-limited road section. If the RSE determines that the vehicle platoon is incapable of safely passing through the weight-limited road section, the RSE controls to segment the vehicle platoon.

In some embodiments, the RSE may analyze images collected in a plurality of times, and determine a speed, a location, and a weight of the other vehicle based on an image analysis result. For example, the RSE may determine a speed of a vehicle based on a location change of the vehicle in images collected in a plurality of times and a time interval for collecting the images in the plurality of times. The RSE may further obtain vehicle model information of the vehicle based on the image analysis result, and may estimate a weight of the vehicle. Alternatively, the RSE may further obtain an identifier of the vehicle based on the image analysis result, and then determine a weight of the vehicle based on a pre-stored correspondence between an identifier and a weight of a vehicle. The identifier of the vehicle may be a license plate number, or may be another identifier that can be used to identify the vehicle.

In some embodiments, the RSE performs step 410 to step 430 in the method shown in FIG. 4. Before step 410, the method 400 may further include determining, by the RSE, that an internet of vehicles has not covered all vehicles on a road. Correspondingly, determining, by the RSE, that an internet of vehicles has not covered all vehicles on a road includes collecting, by the RSE, an image of a neighborhood, determining, by the RSE, first vehicle information based on the image, where the first vehicle information includes at least one of vehicle location information and vehicle model information, receiving, by the RSE, second vehicle information sent by a neighboring vehicle, where the second vehicle information includes at least one of the following types of information vehicle location information and vehicle model information, comparing, by the RSE, the first vehicle information with the second vehicle information, and if the first vehicle information is different from the second vehicle information, determining, by the RSE, that the internet of vehicles has not covered all the vehicles on the road.

It should be noted that the first vehicle information determined by the RSE based on the collected image includes location information and/or vehicle model information of all vehicles in the image. It should be further noted that the second vehicle information includes vehicle information sent by all vehicles in a photographing range of a camera of the RSE.

That is, whether the internet of vehicles has covered all the vehicles on the road may be determined by the RSE by comparing data of a neighboring vehicle collected by a camera with data reported by the neighboring vehicle. For example, the RSE compares location information and/or vehicle model information of all vehicles in an image collected at a moment with location information and/or vehicle model information of a vehicle that are/is received at the moment. If the two totally match, it is considered that the internet of vehicles has covered all the vehicles on the road, otherwise, it is considered that the internet of vehicles has not covered all the vehicles on the road. It should be understood that, to ensure prediction accuracy, vehicle data in a plurality of periods may be collected and compared, for a plurality of times, with data reported by the neighboring vehicle, for example, the data is compared at an interval of 10 minutes. In addition, considering that the internet of vehicles has a very long deployment period and the deployment is a gradual evolution process, a timer may be further set to periodically detect whether the internet of vehicles has covered all the vehicles on the road, for example, performs detection once a month. After the internet of vehicles is completely deployed, detection is no longer required.

In some embodiments, through information exchange between the vehicle, the RSE, and the control center, the control center or the RSE may receive vehicle information reported by the vehicle, estimate, based on the vehicle information reported by the vehicle, whether the vehicle platoon is capable of safely passing through the weight-limited road section, and control, if the vehicle platoon is incapable of safely passing through the weight-limited road section to segment the vehicle platoon.

If the control center performs step 410 to step 430 in the method shown in FIG. 4, before step 410, the method 400 may further include the control center receives indication information sent by the RSE, where the indication information is used to indicate that an internet of vehicles has covered all vehicles on a road. After learning that the internet of vehicles has covered all the vehicles on the road, the control center may determine, based on the received vehicle information, the vehicle platoon information, and the information about the weight-limited road section, whether the vehicle platoon is capable of safely passing through the weight-limited road section.

Figure 5:
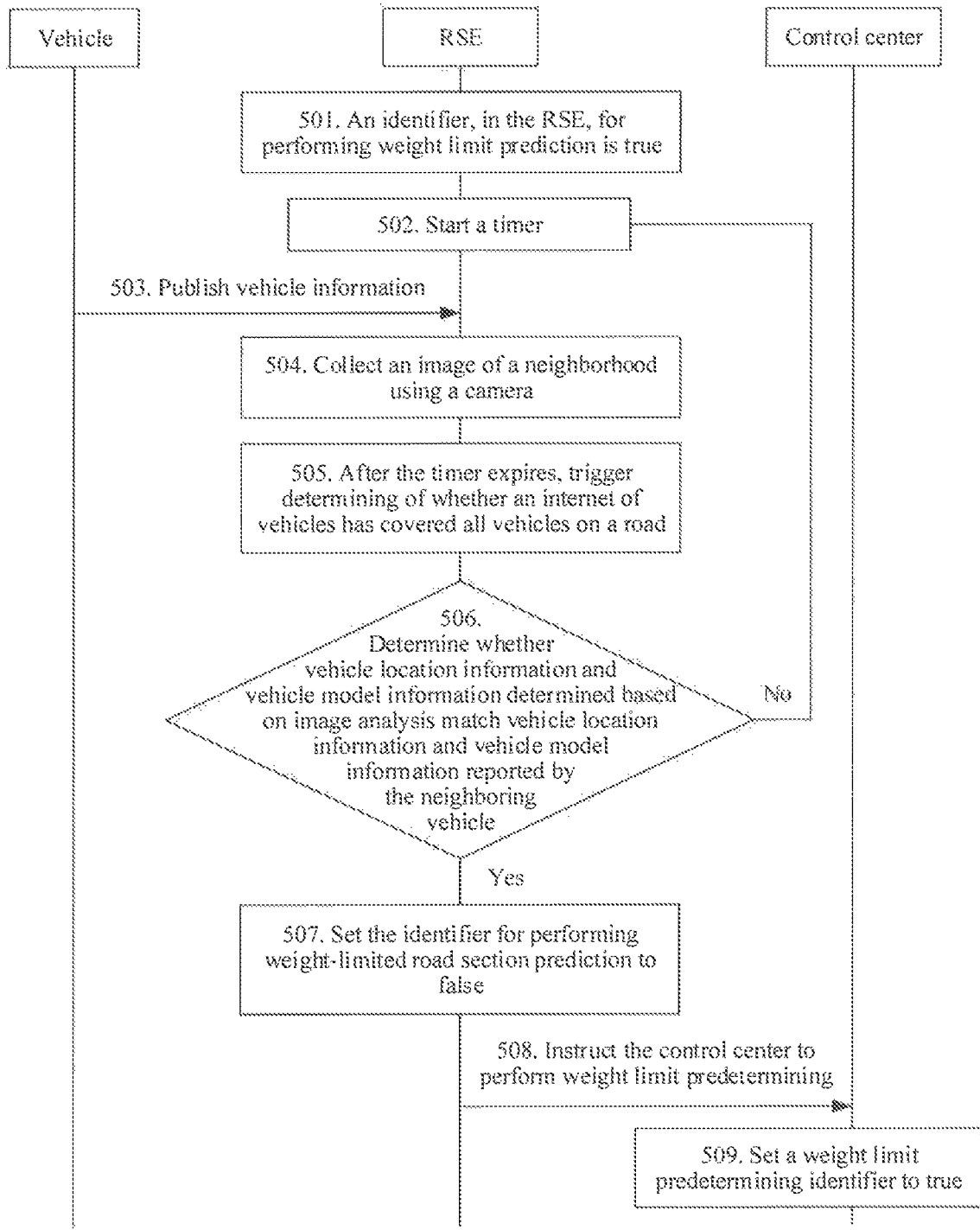
FIG. 5 is a schematic flowchart of a method for determining an internet of vehicles scenario according to an embodiment of the present disclosure.

A method for determining whether an internet of vehicles covers all vehicles on a road is described in detail below with reference to FIG. 5. The method shown in FIG. 5 includes the following content.

Step 501. An identifier, in the RSE, for performing weight limit prediction is true. When the identifier is true, the RSE is responsible for predicting whether a vehicle platoon is capable of passing through a weight-limited road section. When the identifier is false, the RSE is not responsible for predetermining whether the vehicle platoon is capable of passing through the weight-limited road section.

Step 502. Start a timer.

Step 503. A vehicle may periodically publish vehicle information, for example, the vehicle information includes information such as a location, a speed, a weight, a length, and a configuration of the vehicle.

For example, the vehicle may publish the vehicle information using a cooperative awareness message (CAM), but this is not limited in this embodiment of the present disclosure. The vehicle information may be alternatively published using another type of message.

Step 504. The RSE collects an image of a neighborhood using a camera.

Step 505. After the timer expires, trigger determining of whether an internet of vehicles has covered all vehicles on a road.

Step 506. Analyze an image collected at a specific time point, determine, based on image analysis, vehicle location information and vehicle model information of a neighboring vehicle, determine whether the vehicle location information and the vehicle model information determined based on the image analysis match vehicle location information and vehicle model information reported by the neighboring vehicle, and if the vehicle location information and the vehicle model information determined based on the image analysis match the vehicle location information and the vehicle model information reported by the neighboring vehicle, perform step 507, otherwise, go to step 502 and wait for a next detection period.

Optionally, the image of the neighborhood may be collected again after a preset time period (for example, 10 minutes), and vehicle information determined through image analysis is compared again with vehicle information reported by the neighboring vehicle. If the two totally match in a plurality of times (for example, five times) of comparison, it is considered that all the vehicles on the road are connected to the internet, that is, the internet of vehicles has covered all the vehicles on the road, and step 507 is performed. If the two do not totally match in a plurality of times of comparison, it is considered that not all the vehicles are connected to the internet, and step 502 is performed again to wait for a next detection period.

Step 507. The RSE sets the identifier for performing weight-limited road section prediction to false.

508. The RSE instructs a control center or a lead vehicle in the vehicle platoon to perform weight limit predetermining.

After the internet of vehicles covers all the vehicles on the road, the RSE does not determine a status of the internet of vehicles any more, and subsequently the control center or the lead vehicle performs weight limit prediction.

Step 509. The control center or the lead vehicle sets a weight limit predetermining identifier to true according to the instruction of the RSE. This means that when a condition for weight limit determining is met, the control center or the lead vehicle performs weight limit prediction. For subsequent operations, refer to content shown in FIG. 6A and FIG. 6B.

In this embodiment of the present disclosure, a scenario determining problem in a deployment evolution process of the internet of vehicles is resolved. In addition, the identifier for performing weight-limited road section prediction is set in the control center and the RSE such that a basis for determining is provided for a subsequent service process. Different solutions may be used for different coverage scenarios of the internet of vehicles based on the identifier.

Figure 6A:
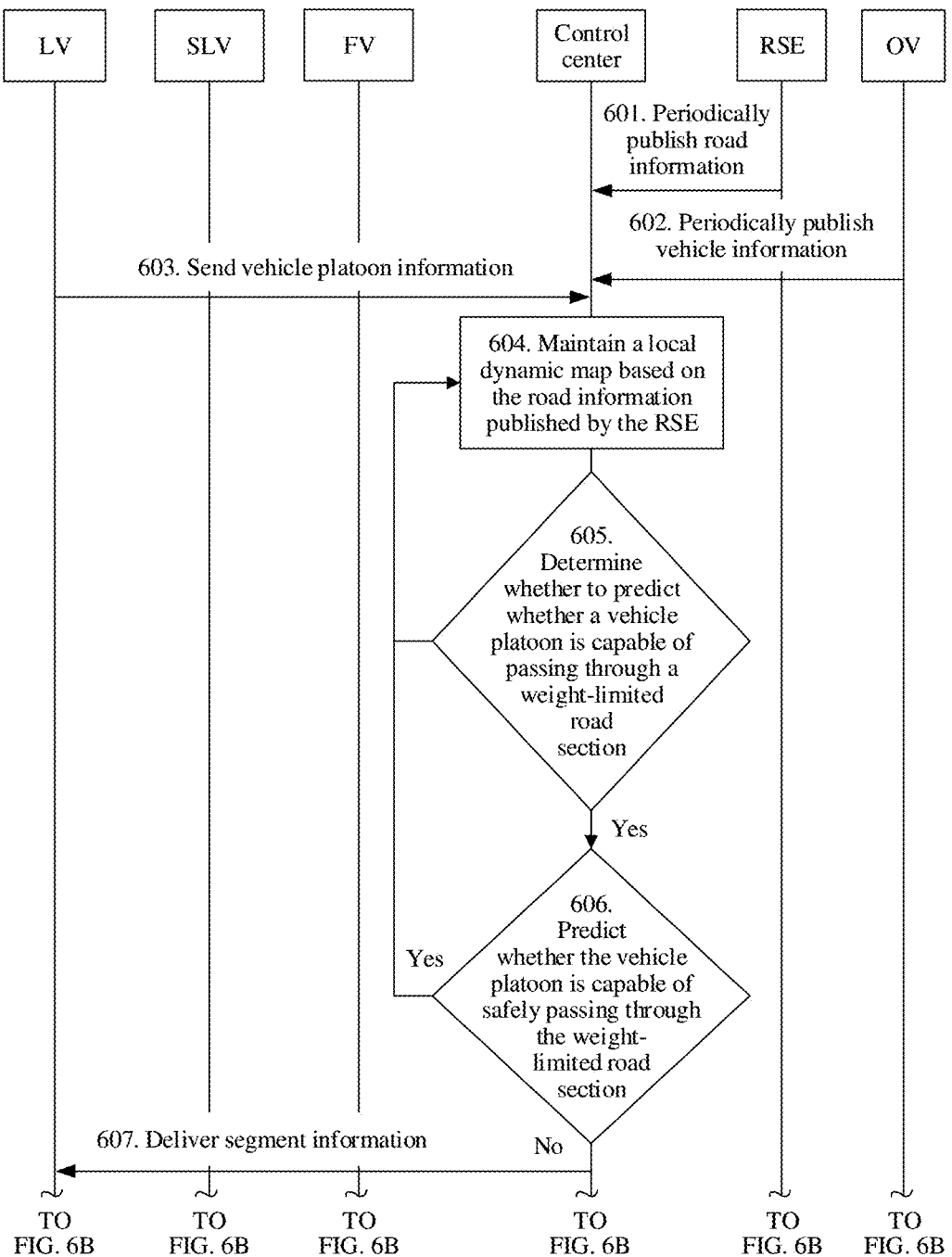
FIG. 6A and FIG. 6B are a schematic flowchart of a method for controlling a vehicle platoon according to another embodiment of the present disclosure.
Figure 6B:
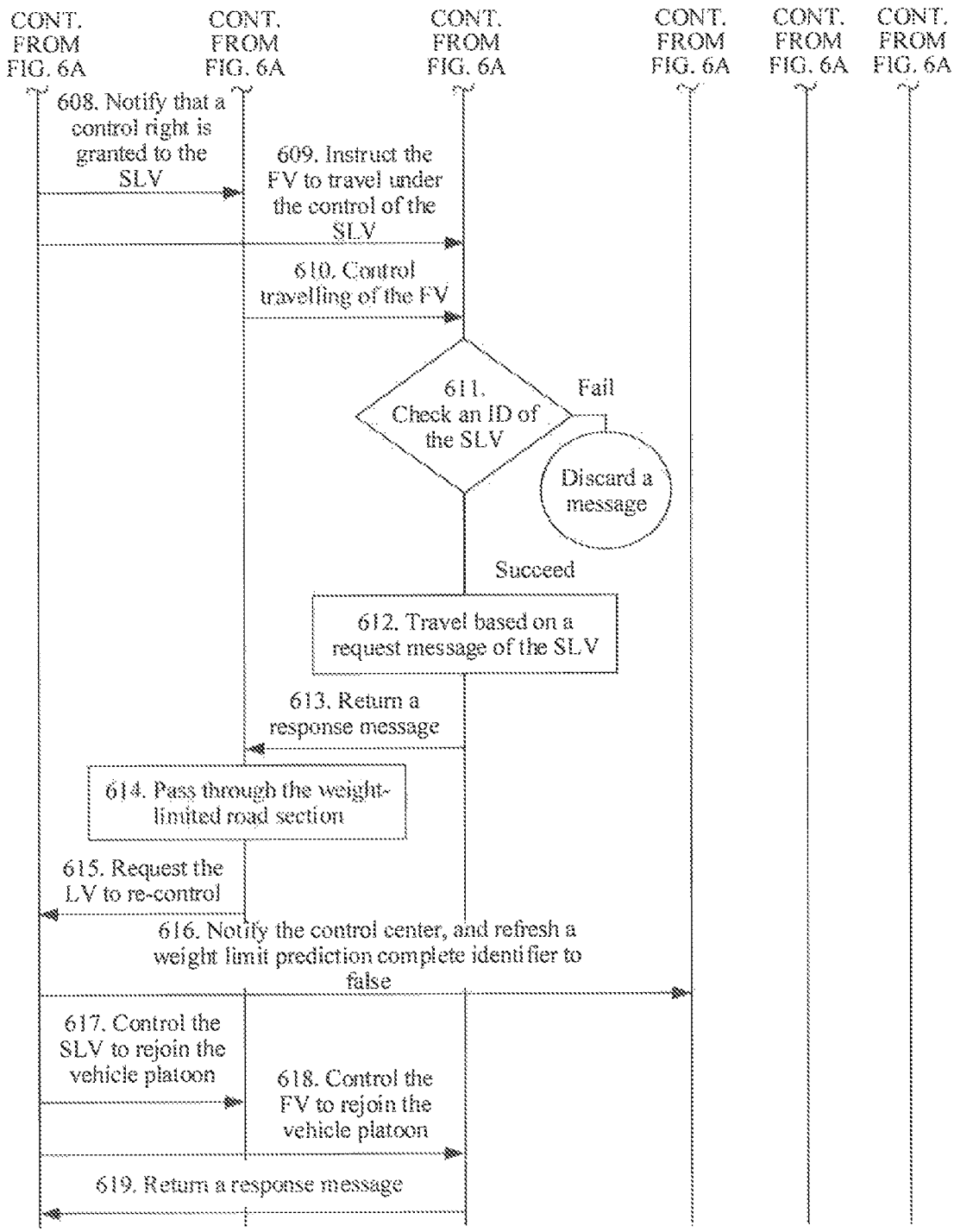
Figure 7:
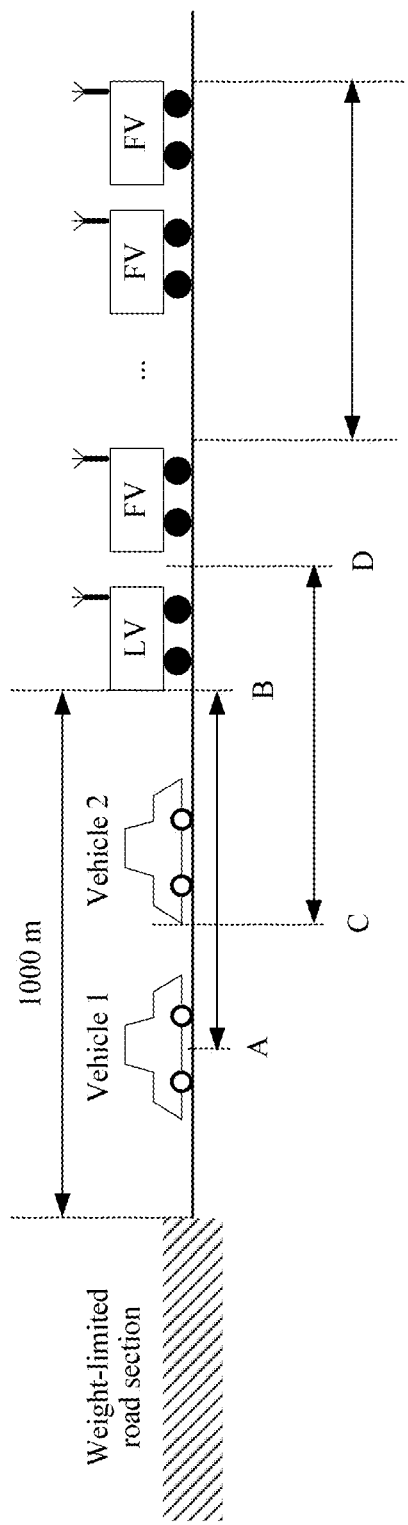
FIG. 7 is a schematic diagram of a method for calculating segment information of a vehicle platoon according to an embodiment of the present disclosure.

A method for controlling a vehicle platoon according to an embodiment of the present disclosure is described in detail below with reference to FIG. 6A, FIG. 6B and FIG. 7. FIG. 6A, FIG. 6B and FIG. 7 are examples of the method shown in FIG. 4. In an example shown in FIG. 6A and FIG. 6B, a control center is used as an example for description. In an example shown in FIG. 7, RSE is used as an example for description.

FIG. 6A and FIG. 6B are a schematic flowchart of a method for controlling a vehicle platoon according to another embodiment of the present disclosure. In this embodiment of the present disclosure, it is assumed that all vehicles are deployed with a V2V near field communication capability. An LV may periodically report vehicle platoon information to a control center. The control center determines whether there is a weight-limited road section in a travelling route of a vehicle platoon. When the vehicle platoon is at a specific distance from the weight-limited road section, collection of information about vehicles within a specific range of the weight-limited road section is started. Whether the vehicle platoon is capable of successfully passing through the weight-limited road section is predetermined based on the vehicle platoon information, information about a vehicle around the vehicle platoon, and information about the weight-limited road section. The vehicle platoon information may include a speed, an acceleration, a location of the vehicle platoon, a length, a weight, and a spacing of each vehicle in the vehicle platoon. The information about the vehicle around the vehicle platoon includes a speed, an acceleration, a location, and a weight of the vehicle around the vehicle platoon. The information about the weight-limited road section includes a length and load of the weight-limited road section. If the control center predetermines that the vehicle platoon is incapable of safely passing through the weight-limited road section, the control center calculates segment information of the vehicle platoon and sends the segment information to the LV. The LV segments the vehicle platoon based on the segment information sent by the control center. After passing through a weight-limited road section, an SLV sends a request to the LV to rejoin the vehicle platoon and releases a control right.

The LV integrates the vehicle platoon and the vehicle platoon continues to travel. Further, the method shown in FIG. 6A and FIG. 6B includes the following content.

Step 601. RSE periodically publishes road information, where the road information includes the information about the weight-limited road section, and the information about the weight-limited road section includes the load and the length of the weight-limited road section.

It should be noted that step 601 may be not performed. For example, the road information may be preconfigured in the control center.

Step 602. An OV periodically publishes the vehicle information using a CAM message, for example, the vehicle information includes a location, a speed, a weight, and a length of the vehicle.

Step 603. The LV sends the vehicle platoon information using the CAM message, for example, the vehicle platoon information includes an identifier of the vehicle platoon, a speed, a location, and a route of the LV in the vehicle platoon, and an identifier (ID), a length, a weight, and a spacing to a previous vehicle of each FV in the vehicle platoon.

Step 604. The control center maintains a local dynamic map (LDM) based on the road information published by the RSE. For example, the control center may maintain the LDM based on data timeliness with reference to data on the map and the road information sent by the RSE.

Step 605. After receiving the message from the LV, the control center determines whether to predict whether the vehicle platoon is capable of passing through the weight-limited road section. All the following conditions need to be met when the control center performs weight limit prediction: (a) There is the weight-limited road section in the travelling route of the vehicle platoon. (b) The control center has permission to perform weight limit prediction. For example, an identifier that is for performing weight-limited road section prediction and that is stored in the control center is true. (c) Weight limit prediction has not been completed for the current weight-limited road section. For example, a weight-limited road section prediction complete identifier stored in the control center is false. (d) A distance between the vehicle platoon and the weight-limited road section is less than or equal to a preset distance (for example, 1000 m). If the conditions for performing weight limit prediction are met, step 606 is performed, otherwise, step 601 to step 604 continue to be performed, to be specific, the control center continues to receive the information reported by the RSE, the OV, and the LV, and maintain the LDM.

Step 606. The control center comprehensively predicts, based on the vehicle platoon information, information about another vehicle around the vehicle platoon, and the information about the weight-limited road section, whether the vehicle platoon is capable of safely passing through the weight-limited road section. Optionally, after completing the prediction, the control center may further set the weight-limited road section prediction complete identifier to true. In this way, the control center can be prevented from repeatedly performing weight limit prediction. If the control center determines that the vehicle platoon is capable of safely passing through the weight-limited road section, the control center continues to wait for the LV to report data. If the control center determines that the vehicle platoon is incapable of safely passing through the weight-limited road section, the control center indicates the LV to segment the vehicle platoon, and calculates a segment location of the vehicle platoon and a spacing S between a segment location of the vehicle platoon and a previous vehicle of the segment. The spacing between the segment location of the vehicle platoon and the previous vehicle of the segment is described below using an example.

It is assumed that the vehicle platoon is 1000 m away from the weight-limited road section, and the vehicle platoon travels at a constant speed. First, a moment T1 at which the vehicle platoon reaches the weight-limited road section is calculated: T1=Current moment+1000/Vehicle platoon speed, and a moment T2 at which all vehicles in the vehicle platoon reach the weight-limited road section is calculated: T2=Current moment+(1000+Vehicle platoon length)/Vehicle platoon speed. When the vehicle platoon is 1000 m away from the weight-limited road section, whether another vehicle around the vehicle platoon falls within a prediction range in a time period from T1 to T2 and a location, in the prediction range, of the other vehicle around the vehicle platoon are predicted based on a location and a vehicle speed of the other vehicle around the vehicle platoon relative to the vehicle platoon and based on a time interval $\Delta T$ such that predetermining is performed based on weight information of a vehicle in the prediction range. The prediction range is a range covered by the length of the weight-limited road section on a current road. $\Delta T$ depends on duration used by the foremost vehicle in the current prediction range to move out of the prediction range. Whether the vehicle platoon is capable of successfully passing through the weight-limited road section is predicted at each moment. If it is predicted that a weight of vehicles in the current prediction range reaches maximum load of the weight-limited road section, a subsequent vehicle cannot travel onto the weight-limited road section when not all vehicles in the prediction range (that is, in the time period $\Delta T$) have passed through the weight-limited road section. In this case, a sub vehicle platoon spacing may be increased until the weight-limited road section can bear load of the subsequent vehicle. In addition, T2 is recalculated based on the increased sub vehicle platoon spacing. After the prediction calculation is complete, the segment information used for enabling the vehicle platoon to pass through the weight-limited road section and the spacing obtained through segmentation are provided. Optionally, some load redundancies may be further reserved based on vehicle model information of the other vehicle around the vehicle platoon. It should be understood that vehicles within the prediction range dynamically change at different moments. It should also be understood that $\Delta T$ also dynamically changes because the foremost vehicle within a prediction range at each moment has a different speed and a different relative location in the prediction range.

A first prediction range at the moment T1 is a range on the road that is front of the lead vehicle and whose distance to the lead vehicle is less than or equal to the length of the weight-limited road section, that is, a range between A and B on a road shown in FIG. 7. After $\Delta T$, the foremost vehicle 1 within the first prediction range drives out the prediction range. A prediction range at a moment $T1+\Delta T$ is a range in which a head of a vehicle 2 is used as a start point and whose length is the length of the weight-limited road section, that is, a range between C and D on the road shown in FIG. 7. By analogy, after each vehicle drives out of a current prediction range, a prediction range at a next moment is redetermined using a vehicle, as a start point, that is behind the vehicle and that is the closest to the vehicle, and this operation is repeated n times until all vehicles in the vehicle platoon reach the weight-limited road section, that is, $T1+n\times \Delta T \geq T2$. The time period $\Delta T$ is used as an interval to predict whether the vehicle platoon in prediction range is capable of successfully passing through the weight-limited road section.

It should be noted that the foregoing is only an example method for calculating the segment location and the vehicle spacing at the segment of the vehicle platoon, and is merely intended to help a person skilled in the art better understand the embodiments of the present disclosure, rather than limiting the scope of the embodiments of the present disclosure. The person skilled in the art can make various equivalent modifications or changes based on the examples provided above, and such modifications or changes also fall within the scope of the embodiments of the present disclosure.

If the vehicle platoon is incapable of safely passing through the weight-limited road section, step 607 is performed. If the vehicle platoon is capable of safely passing through the weight-limited road section, step 601 to step 605 continue to be performed, to be specific, the control center continues to receive the information reported by the RSE, the OV, and the LV, maintain the LDM, and determine whether to predict whether the vehicle platoon is capable of passing through the weight-limited road section.

Step 607. The control center delivers the segment information to the LV, where the segment information includes an ID of an SLV at a segment and a distance between the SLV and a previous vehicle.

Step 608. After receiving the segment information, the LV sends a first notification message to the SLV based on the segment information, to notify that a control right is granted to the SLV, and to notify a vehicle spacing between the SLV and a previous FV and an ID of an FV controlled by the SLV. The first notification message includes indication information used to indicate that the control right is granted to the SLV, and indicate a distance between the SLV and the previous FV and the identifier of the FV controlled by the SLV.

When the segment information indicates that the vehicle platoon is segmented into a plurality of SLVs, the LV may send the first notification message to the plurality of SLVs in a broadcast, multicast, or unicast manner. This is not limited in this embodiment of the present disclosure.

Step 609. The LV sends the ID of the SLV to an FV in the segment in which the SLV is located. In this way, the FV travels under the control of the SLV.

After receiving a second notification message, the FV refreshes a local record of the SLV, and stores the ID of the SLV.

Step 610. The SLV sends a request message to the FV in the segment in which the SLV is located, to control travelling of the FV. For example, the request message is used to adjust a vehicle speed to a target vehicle speed. The request message includes the target vehicle speed and the ID of the SLV.

Step 611. After receiving the request message, the FV checks the ID of the SLV, and if the check fails, the FV discards the request message and does not process the request message.

Step 612. If the check for the ID of the SLV succeeds, the FV travels based on the request message of the SLV. For example, the FV adjusts the vehicle speed to the target vehicle speed.

Step 613. After adjusting the vehicle speed, the FV returns a response message to the SLV.

Step 614. The SLV passes through the weight-limited road section.

Step 615. The SLV sends a combination request to the LV to request the LV to re-control a vehicle in the segment in which the SLV is located, where the combination request includes ID information of the SLV.

Step 616. After receiving the combination request, the LV notifies the control center, and refreshes a weight limit prediction complete identifier to false.

Step 617. The LV controls the SLV to rejoin the vehicle platoon. For example, the LV sends a combination response to the SLV to instruct the SLV to release the control right, and instruct the LV to control the vehicle platoon.

Step 618. The LV controls the FV to rejoin the vehicle platoon. For example, the LV instructs the FV to travel under the control of the LV. Optionally, the FV may refresh the local record of the SLV and delete the recorded ID of the SLV, and then, the FV travels under the control of the LV by default. Optionally, the FV may further record an ID of the LV, and then the FV travels under the control of the LV.

Step 619. After the adjustment is complete, the FV returns a response message.

In this case, the LV takes over the SLV and the FV again, and the vehicle platoon travels normally.

Figure 8A:
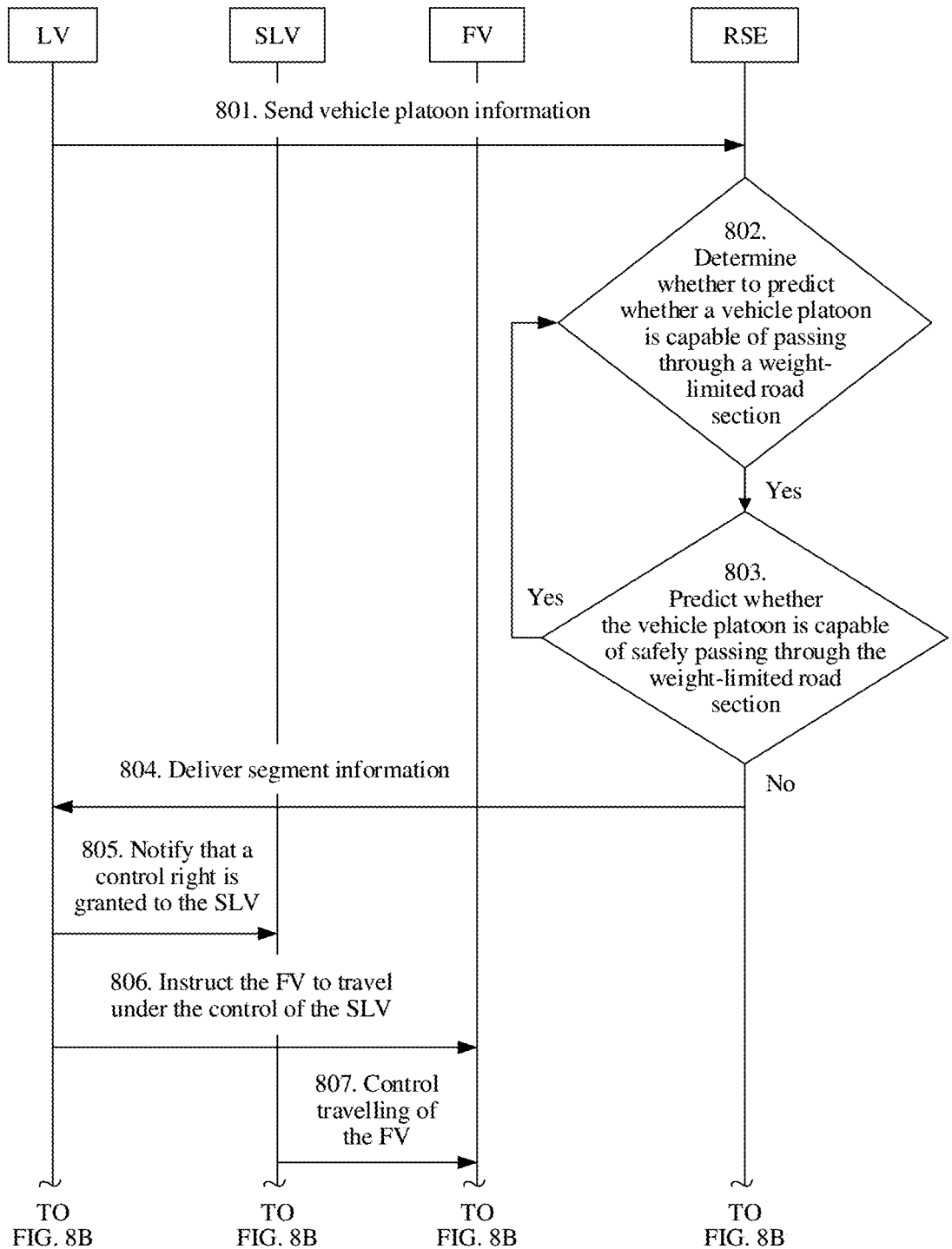
FIG. 8A and FIG. 8B are a schematic flowchart of a method for controlling a vehicle platoon according to another embodiment of the present disclosure.
Figure 8B:
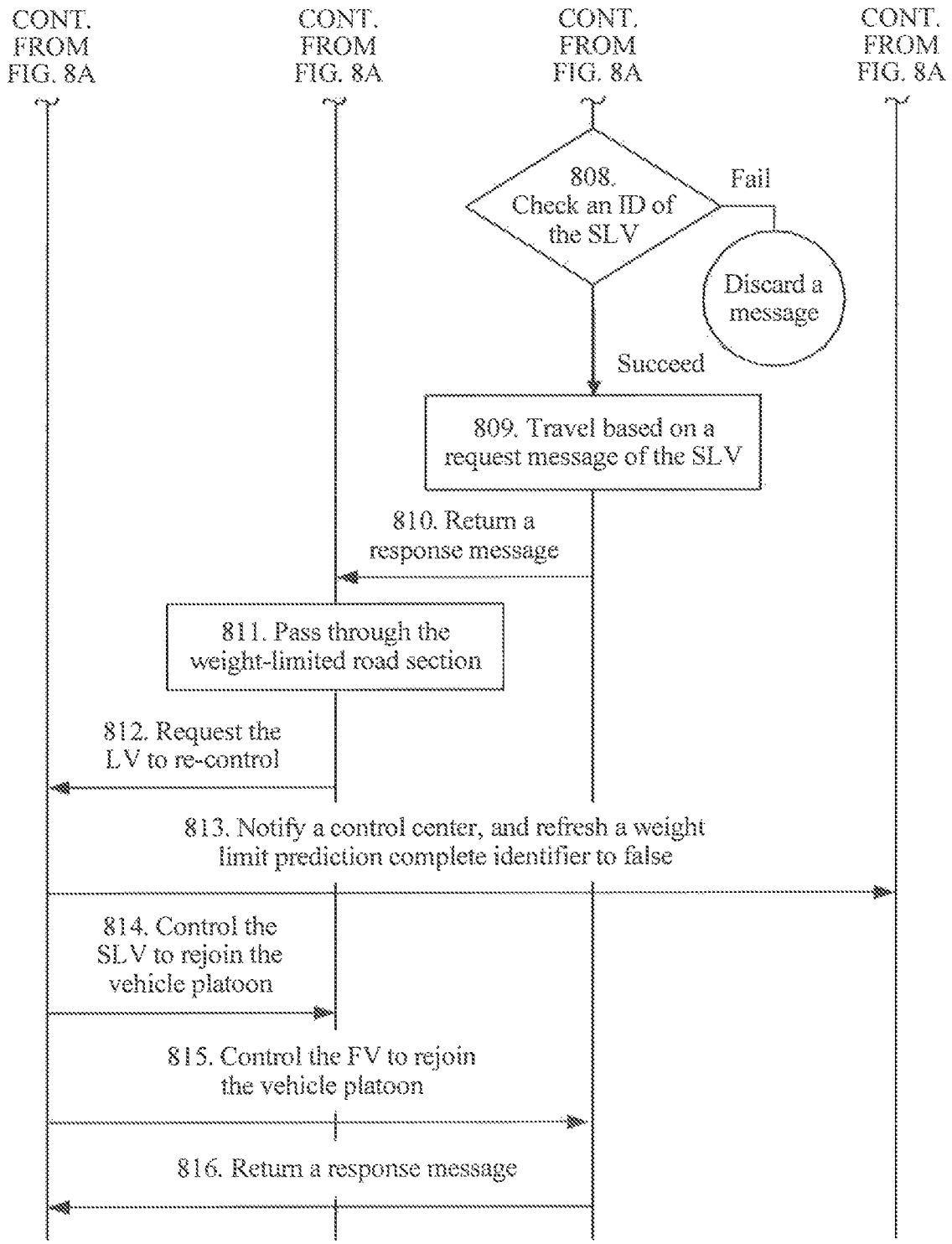

FIG. 8A and FIG. 8B are a schematic flowchart of a method for controlling a vehicle platoon according to another embodiment of the present disclosure. This embodiment of the present disclosure corresponds to a scenario in which an identifier, in RSE, for performing weight limit prediction is true, that is, a scenario in which an internet of vehicles is not fully deployed. In this case, the RSE and a control center cannot receive information about all vehicles around a vehicle platoon and near a weight-limited road section. Therefore, in this embodiment of the present disclosure, cameras may be deployed in RSE at two ends of a weight-limited road section to predict weight information of a vehicle on a road through image processing. If it is predicted that the vehicle platoon is capable of safely passing through the weight-limited road section, the RSE continues to wait for the vehicle platoon to report a message next time. If it is predicted that the vehicle platoon is incapable of safely passing through the weight-limited road section, the RSE calculates segment information of the vehicle platoon and sends the segment information to an LV. The LV segments the vehicle platoon based on the segment information, and after the segmentation, the LV and an SLV control travelling of following vehicles in respective segments. After passing through the weight-limited road section, the SLV sends a request to the LV to rejoin the vehicle platoon. Then the LV cancels a control right of the SLV, and the LV re-integrates the vehicle platoon and continues travelling. Further, the method shown in FIG. 8A and FIG. 8B includes the following content.

Step 801. The LV publishes vehicle platoon information using a CAM message, where the vehicle platoon information may include an ID of the vehicle platoon, a speed, a location, and a route of the LV in the vehicle platoon, and an ID, a length, a weight, and a spacing to a previous vehicle of each vehicle in the vehicle platoon.

Step 802. After receiving the vehicle platoon information sent by the LV, the RSE determines whether to predict whether the vehicle platoon is capable of passing through the weight-limited road section. All the following conditions need to be met when the RSE performs weight limit prediction: (a) The RSE has permission to perform weight limit prediction. For example, an identifier that is for performing weight-limited road section prediction and that is stored in the RSE is true. (b) Weight limit prediction has not been completed for a current weight-limited road section. For example, a current weight-limited road section prediction complete identifier stored in the RSE is false. (c) A distance between the vehicle platoon and the weight-limited road section is less than or equal to a preset distance (for example, 1500 m). When predicting, the RSE needs to perform repeated sampling in a plurality of periods, and therefore, time of sampling periods needs to be reserved. If prediction of whether the vehicle platoon is capable of passing through the weight-limited road section needs to be performed, step 801 continues to be performed, to be specific, the RSE continues to receive information reported by the LV, and determines whether to predict whether the vehicle platoon is capable of passing through the weight-limited road section.

Step 803. The RSE analyzes a collected image to estimate information about another vehicle around the vehicle platoon. Then, the RSE comprehensively predicts, based on the vehicle platoon information, the information about the other vehicle around the vehicle platoon, and information about the weight-limited road section, whether the vehicle platoon is capable of safely passing through the weight-limited road section. Optionally, after completing the prediction, the RSE may further set the weight-limited road section prediction complete identifier to true. In this way, the RSE can be prevented from repeatedly performing weight limit prediction. If the RSE determines that the vehicle platoon is capable of safely passing through the weight-limited road section, the RSE continues to wait for the vehicle platoon to report data next time. If the RSE determines that the vehicle platoon is incapable of safely passing through the weight-limited road section, the RSE segments the vehicle platoon, and calculates a segment location of the vehicle platoon and a distance between the segment and a previous vehicle.

It is assumed that a collection range of a camera is 500 m to 2000 m. Cameras are installed at 1000 m at the two ends of the weight-limited road section. Weight limit prediction is performed when the vehicle platoon is 1500 m away from the weight-limited road section. The cameras collect images at a plurality of time points. Other vehicles (referred to as static vehicles below) whose locations relative to the vehicle platoon slightly change are identified using an image recognition technology. Weight information of these static vehicles is calculated based on vehicle models of the static vehicles and weights of the static vehicles estimated based on load conditions. Then, other vehicles (referred to as dynamic vehicles below) whose locations relative to the vehicle platoon have relatively great changes are estimated based on a vehicle direction and vehicle traffic within the range of the camera, and weight information of these dynamic vehicles is estimated based on vehicle model information in the collection range of the camera. Whether the vehicle platoon is capable of safely passing through the weight-limited road section is determined based on information about the static vehicles and information about the dynamic vehicles. When the vehicle platoon is incapable of safely passing through the weight-limited road section, a segment location of the vehicle platoon and a distance between segments are estimated.

If the vehicle platoon is incapable of safely passing through the weight-limited road section, step 804 is performed. If the vehicle platoon is capable of safely passing through the weight-limited road section, step 801 and step 802 continue to be performed, to be specific, the control center continues to receive the information reported by the LV, and determine whether to predict the vehicle platoon is capable of passing through the weight-limited road section.

Step 804. The RSE delivers the segment information to the LV, including an ID of an SLV at a segment and a distance between each SLV and a previous FV.

For steps 805 to 816, refer to steps 608 to 619 in the method shown in FIG. 6B. To avoid repetition, details are not described herein again.

It should be noted that in the foregoing method embodiments, that the control center or the RSE performs weight limit prediction is only used as an example for description, but an embodiment of the present disclosure is not limited thereto. A lead vehicle in a vehicle platoon may alternatively perform weight limit prediction. Further, the lead vehicle determines whether the vehicle platoon is capable of safely passing through a weight-limited road section, and when the vehicle platoon is incapable of safely passing through the weight-limited road section, determines segment information of the vehicle platoon, and segments the vehicle platoon based on the segment information. A method used by the lead vehicle to determine whether the vehicle platoon is capable of safely passing through the weight-limited road section is similar to the method used by the control center in the foregoing embodiments. To avoid repetition, details are not described herein again. In some embodiments, the lead vehicle in the vehicle platoon can communicate with another vehicle within a preset distance, and the lead vehicle may receive information such as a speed, a location, and a weight of the other vehicle from the other vehicle. In some other embodiments, the lead vehicle in the vehicle platoon may further receive the information such as the speed, the location, and the weight of the other vehicle from the control center or the RSE. The lead vehicle may further receive information about the weight-limited road section from the control center or the RSE. Alternatively, information about the weight-limited road section may be prestored in the lead vehicle.

It should be further noted that, before the lead vehicle determines whether the vehicle platoon is capable of safely passing through a weight-limited road section, the lead vehicle may further determine a condition of meeting weight limit prediction. For details, refer to related content performed by the RSE and the control center in the foregoing method embodiments. Details are not described herein again.

A control device and an on-board terminal according to the embodiments of the present disclosure are described below with reference to FIG. 9 to FIG. 11.

Figure 9:
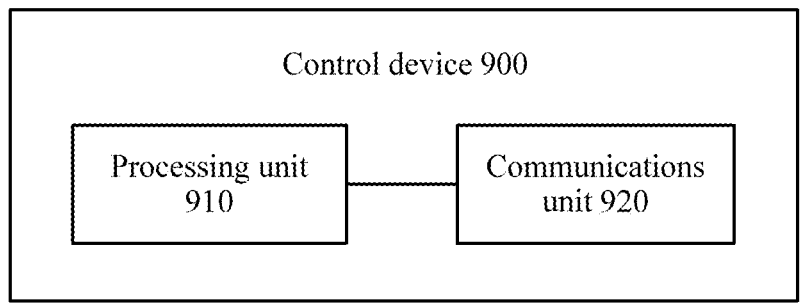
FIG. 9 is a schematic structural diagram of a control device according to another embodiment of the present disclosure.

FIG. 9 is a schematic structural diagram of a control device 900 according to an embodiment of the present disclosure. It should be understood that the control device 900 may be the control center or the RSE in the methods shown in FIG. 4, FIG. 5, FIG. 6A and FIG. 6B, and FIG. 8A and FIG. 8B. It should be understood that the control device 900 may be alternatively a lead vehicle in a vehicle platoon. As shown in FIG. 9, the control device 900 includes a processing unit 910 and a communications unit 920.

The processing unit 910 is configured to determine whether the vehicle platoon is capable of safely passing through a weight-limited road section.

The processing unit 910 is further configured to determine segment information of the vehicle platoon when the vehicle platoon is incapable of safely passing through the weight-limited road section. The segment information includes an identifier of at least one sub lead vehicle and a distance between each sub lead vehicle and a previous following vehicle. Each sub lead vehicle is the first following vehicle at a segment of the vehicle platoon, and each sub lead vehicle controls travelling of a following vehicle in the segment.

The communications unit 920 is configured to communicate with another device.

In this embodiment of the present disclosure, the control device 900 predetermines whether the vehicle platoon is capable of safely passing through the weight-limited road section, and if the vehicle platoon is incapable of safely passing through the weight-limited road section, the control device 900 sends the segment information of the vehicle platoon to the lead vehicle in the vehicle platoon, and the lead vehicle segments the vehicle platoon based on the segment information such that the vehicle platoon is capable of safely passing through the weight-limited road section.

Optionally, the processing unit 910 is further configured to obtain vehicle platoon information of the vehicle platoon, where the vehicle platoon information includes a travelling route, a speed, a location, and a vehicle spacing of the vehicle platoon, and a weight and a length of each vehicle in the vehicle platoon, obtain information about another vehicle within a preset distance of the vehicle platoon, where the information about the other vehicle includes a speed, a location, and a weight of the other vehicle, obtain information about the weight-limited road section, where the information about the weight-limited road section includes a length and load of the weight-limited road section, and determine the segment information based on the vehicle platoon information, the information about the other vehicle, and the information about the weight-limited road section.

Optionally, the control device 900 is a control center or is an on-board terminal applied to the lead vehicle. Correspondingly, the communications unit 920 is further configured to receive a message reported by the other vehicle within the preset distance of the vehicle platoon. Correspondingly, the processing unit 910 is further configured to obtain information about the other vehicle from the message received by the communications unit 920.

Optionally, the control device 900 is a control center or is an on-board terminal applied to the lead vehicle. Correspondingly, the communications unit 920 is further configured to receive, before the processing unit 910 determines whether the vehicle platoon is capable of safely passing through the weight-limited road section, indication information sent by the RSE. The indication information is used to indicate that an internet of vehicles has covered all vehicles on a road.

Optionally, the control device 900 is RSE. Correspondingly, the control device 900 may further include an image collection unit (not shown). The image collection unit is configured to collect an image of the other vehicle within the preset distance of the vehicle platoon. The processing unit 910 is further configured to determine the information about the other vehicle based on the image collected by the image collection unit.

Optionally, the control device 900 is RSE. Correspondingly, the processing unit 910 is further configured to determine, before determining whether the vehicle platoon is capable of safely passing through the weight-limited road section, that an internet of vehicles has not covered all vehicles on a road.

Optionally, the image collection unit is further configured to collect an image of a neighborhood of the device. The processing unit 910 is further configured to determine first vehicle information of a neighboring vehicle based on the image, and the first vehicle information includes at least one of the following types of information vehicle location information and vehicle model information. The communications unit 920 is further configured to receive second vehicle information sent by the neighboring vehicle of the device, and the second vehicle information includes at least one of the following types of information vehicle location information and vehicle model information. The processing unit 910 is further configured to compare the first vehicle information determined by the processing unit 910 with the second vehicle information received by the communications unit 920, and if the first vehicle information is different from the second vehicle information, determine that the internet of vehicles has not covered all the vehicles on the road.

Optionally, the processing unit 910 is further configured to determine, based on the vehicle platoon information, the information about the other vehicle, and the information about the weight-limited road section, whether the vehicle platoon is capable of safely passing through the weight-limited road section.

Optionally, the control device 900 is a control center or RSE. Correspondingly, the communications unit 920 is configured to send the segment information determined by the processing unit 910 to the lead vehicle in the vehicle platoon.

Optionally, the processing unit 910 is further configured to determine, before determining whether the vehicle platoon is capable of safely passing through the weight-limited road section, a condition of meeting weight limit prediction.

Optionally, the condition includes that a distance between the vehicle platoon and the weight-limited road section is less than or equal to a preset distance, and that weight limit prediction has not been completed for the weight-limited road section.

Optionally, the condition further includes having permission to perform weight limit prediction.

It should be understood that the control device 900 according to this embodiment of the present disclosure may correspond to the control center, the RSE, or the lead vehicle in the vehicle platoon in the method for controlling a vehicle platoon according to the embodiments of the present disclosure. In addition, the foregoing and other operations and/or functions of the modules in the control device 900 are separately for implementing corresponding processes performed by the control center or the RSE in the foregoing methods. For brevity, details are not described herein again.

It should be noted that the processing unit may be implemented by a processor, and the communications unit may be implemented by a transceiver. When the processing unit 910 is implemented by a processor and the communications unit 920 is implemented by a transceiver, for a structure of the control device, refer to FIG. 3. Details are not described herein again.

Figure 10:
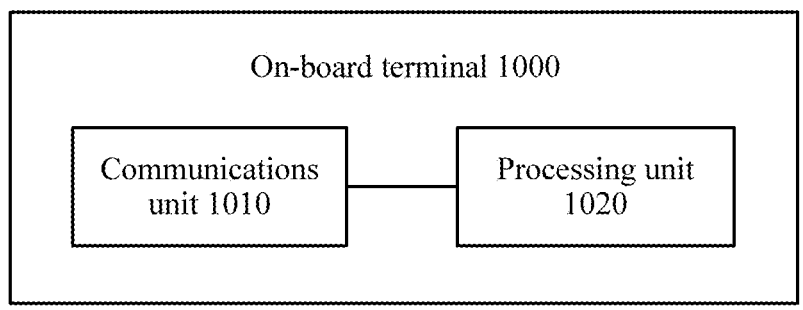
FIG. 10 is a schematic structural diagram of an on-board terminal according to another embodiment of the present disclosure.

FIG. 10 is a schematic structural diagram of an on-board terminal 1000 according to an embodiment of the present disclosure. The on-board terminal 1000 is applied to a lead vehicle in a vehicle platoon. As shown in FIG. 10, the on-board terminal 1000 includes a communications unit 1010 and a processing unit 1020.

The communications unit 1010 is configured to communicate with another device.

The processing unit 1020 is configured to obtain segment information of the vehicle platoon. The segment information includes an identifier of at least one sub lead vehicle and a distance between each of the at least one sub lead vehicle and a previous following vehicle. Each sub lead vehicle is the first following vehicle at a segment of the vehicle platoon, and each sub lead vehicle controls travelling of a following vehicle in the segment.

The processing unit 1020 is further configured to segment the vehicle platoon based on the segment information. After the vehicle platoon is segmented, the lead vehicle and the at least one sub lead vehicle control travelling of a remaining following vehicle in each segment of the vehicle platoon.

In this embodiment of the present disclosure, the lead vehicle in the vehicle platoon may segment the vehicle platoon based on the segment information of the vehicle platoon such that the vehicle platoon is capable of safely passing through the weight-limited road section.

Optionally, the processing unit 1020 is further configured to control, based on the segment information, the communications unit 1010 to send a notification message to the at least one sub lead vehicle. The notification message includes indication information used to indicate that a control right is granted to the at least one sub lead vehicle and indicate a distance between each of the at least one sub lead vehicle and a previous following vehicle.

Optionally, the processing unit 1020 is further configured to control, based on the segment information, the communications unit to send, to at least one following vehicle controlled by the at least one sub lead vehicle, an identifier of a sub lead vehicle in a segment in which the at least one following vehicle is located.

Optionally, the communications unit 1010 is further configured to receive a combination request sent by the at least one sub lead vehicle. The combination request is used to request the lead vehicle to re-control the at least one sub lead vehicle and a following vehicle controlled by the at least one sub lead vehicle. Correspondingly, the processing unit 1020 is further configured to cancel the control right of the at least one sub lead vehicle based on the combination request received by the communications unit 1010, and re-control the at least one sub lead vehicle and the following vehicle controlled by the at least one sub lead vehicle.

Optionally, the communications unit 1010 is configured to receive a segment message sent by RSE or a control center. The segment message includes the segment information. Correspondingly, the processing unit 1020 is further configured to obtain the segment information from the segment message received by the communications unit 1010.

Optionally, the communications unit 1010 is further configured to send vehicle platoon information to the RSE or the control center. The vehicle platoon information includes a speed, a location, and a vehicle spacing of the vehicle platoon.

Optionally, the vehicle platoon information further includes a travelling route of the vehicle platoon, and a weight and a length of each vehicle in the vehicle platoon.

It should be understood that the on-board terminal 1000 according to this embodiment of the present disclosure may correspond to the lead vehicle in the method for controlling a vehicle platoon according to the embodiments of the present disclosure. In addition, the foregoing and other operations and/or functions of the modules in the on-board terminal 1000 are separately for implementing corresponding processes performed by the lead vehicle in the methods in FIG. 4 to FIG. 6A and FIG. 6B, and FIG. 8A and FIG. 8B. For brevity, details are not described herein again.

It should be noted that the communications unit may be implemented by a transceiver, and the processing unit may be implemented by a processor. When the processing unit 1020 is implemented by a processor and the communications unit 1010 is implemented by a transceiver, for a structure of the on-board terminal, refer to FIG. 3. Details are not described herein again.

Figure 11:
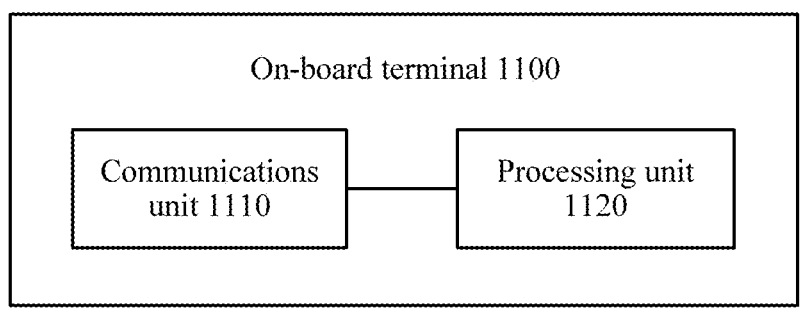
FIG. 11 is a schematic structural diagram of an on-board terminal according to another embodiment of the present disclosure.

FIG. 11 is a schematic structural diagram of an on-board terminal 1100 according to another embodiment of the present disclosure. The on-board terminal 1100 is applied to a following vehicle in a vehicle platoon. The on-board terminal 1100 includes a communications unit 1110 and a processing unit 1120.

The communications unit 1110 is configured to receive a notification message sent by a lead vehicle in the vehicle platoon. The notification message includes indication information used to indicate that a control right is granted to a sub lead vehicle and indicate a distance between the sub lead vehicle and a previous following vehicle.

The processing unit 1120 is configured to enable, based on the notification message received by the communications unit 1110, the following vehicle to control, as the sub lead vehicle, travelling of a following vehicle in a segment in which the sub lead vehicle is located, and enable the sub lead vehicle to keep a distance from a previous following vehicle in the vehicle platoon.

In this embodiment of the present disclosure, the sub lead vehicle in the vehicle platoon may keep a distance from the previous following vehicle, and control travelling of the following vehicle in the segment in which the sub lead vehicle is located such that the vehicle platoon is capable of safely passing through a weight-limited road section.

Optionally, the processing unit 1120 is further configured to determine whether a weight-limited road section is passed through. The communications unit 1110 is further configured to send a combination request to the lead vehicle when the processing unit 1120 determines that the weight-limited road section has been passed through. The combination request is used to request the lead vehicle to re-control the sub lead vehicle with the on-board terminal 1100 and the following vehicle controlled by the sub lead vehicle.

It should be understood that the on-board terminal 1100 according to this embodiment of the present disclosure may correspond to the sub lead vehicle in the method for controlling a vehicle platoon according to the embodiments of the present disclosure. In addition, the foregoing and other operations and/or functions of the modules in the on-board terminal 1100 are separately for implementing corresponding processes performed by the sub lead vehicle in the methods in FIG. 5, FIG. 6A and FIG. 6B, and FIG. 8A and FIG. 8B. For brevity, details are not described herein again.

It should be noted that the communications unit may be implemented by a transceiver, and the processing unit may be implemented by a processor. When the processing unit 1120 is implemented by a processor and the communications unit 1110 is implemented by a transceiver, for a structure of the on-board terminal, refer to FIG. 3. Details are not described herein again.

Another embodiment of the present disclosure further provides an internet of vehicles system. The internet of vehicles system includes the control device shown in FIG. 9, a lead vehicle equipped with the on-board terminal shown in FIG. 10, at least one sub lead vehicle equipped with the on-board terminal shown in FIG. 11, and at least one following vehicle. The internet of vehicles system in this embodiment of the present disclosure can enable a vehicle platoon to safely pass through a weight-limited road section.

A person of ordinary skill in the art may be aware that, units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the embodiments of the present disclosure essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device which is a control center or roadside equipment (RSE), wherein the electronic device comprises:
   a memory configured to store instructions; and
   a processor coupled to the memory and configured to execute the instructions to cause the electronic device to:
      determine whether a vehicle platoon is capable of safely passing through a weight-limited road section;
      generate segment information of the vehicle platoon when the vehicle platoon is incapable of safely passing through the weight-limited road section; and
      control the vehicle platoon by sending the segment information to a lead vehicle in the vehicle platoon, wherein the segment information comprises an identifier of a sub lead vehicle and a distance between the sub lead vehicle and a previous vehicle of the sub lead vehicle in the vehicle platoon, wherein the sub lead vehicle is a first vehicle at a corresponding segment of the vehicle platoon, and wherein the sub lead vehicle controls travelling of a following vehicle in the corresponding segment.

2. The electronic device of claim 1, wherein the instructions further cause the electronic device to be configured to:
   obtain vehicle platoon information of the vehicle platoon, wherein the vehicle platoon information comprises a travelling route, a speed, a location, a vehicle spacing of the vehicle platoon, and a weight and a length of each vehicle in the vehicle platoon;
   obtain information about another vehicle within a preset distance of the vehicle platoon, wherein the information about the other vehicle comprises a speed, a location, and a weight of the other vehicle; and
   obtain information about the weight-limited road section, wherein the information about the weight-limited road section comprises a length and load of the weight-limited road section, and
   wherein generating the segment information of the vehicle platoon comprises generating the segment information based on the vehicle platoon information, the information about the other vehicle, and the information about the weight-limited road section when the vehicle platoon is incapable of safely passing through the weight-limited road section.

3. The electronic device of claim 2, wherein the instructions further cause the electronic device to receive the information about the other vehicle within the preset distance of the vehicle platoon.

4. The electronic device of claim 2, wherein the electronic device is further configured to determine, based on the vehicle platoon information, the information about the other vehicle and the information about the weight-limited road section, whether the vehicle platoon is capable of safely passing through the weight-limited road section.

5. The electronic device of claim 1, wherein the instructions further cause the electronic device to receive indication information from the RSE, and wherein the indication information indicates that an internet of vehicles has covered vehicles in the vehicle platoon and another vehicle within a preset distance of the vehicle platoon.

6. The electronic device of claim 1, wherein a condition of meeting weight limit prediction includes that a distance between the vehicle platoon and the weight-limited road section is less than or equal to a preset distance.

7. The electronic device of claim 6, wherein the condition further comprises that a second distance between the vehicle platoon and the weight-limited road section is less than or equal to a second preset distance, and that weight limit prediction has not been completed for the weight-limited road section.

8. The electronic device of claim 7, wherein the condition of meeting weight limit prediction further comprises having permission to perform the weight limit prediction.

9. A method for controlling a vehicle platoon, wherein the method is implemented by a lead vehicle in the vehicle platoon, and wherein the method comprises:
obtaining segment information of the vehicle platoon, wherein the segment information comprises an identifier of a sub lead vehicle and a distance between the sub lead vehicle and a previous vehicle of the sub lead vehicle in the vehicle platoon, wherein the sub lead vehicle is a first vehicle at a corresponding segment of the vehicle platoon, and wherein the sub lead vehicle controls travelling of a following vehicle in the corresponding segment;
controlling the vehicle platoon by segmenting the vehicle platoon based on the segment information, wherein the lead vehicle and the sub lead vehicle control travelling of a following vehicle in a corresponding segment of the vehicle platoon after the vehicle platoon is segmented;
receiving a combination request from the sub lead vehicle, wherein the combination request requests the lead vehicle to re-control the sub lead vehicle and the following vehicle controlled by the sub lead vehicle;
cancelling a control right of the sub lead vehicle based on the combination request; and
re-controlling the sub lead vehicle and the following vehicle controlled by the sub lead vehicle.

10. The method of claim 9, further comprising sending a notification message to the sub lead vehicle based on the segment information, wherein the notification message comprises indication information indicating that a control right is granted to the sub lead vehicle and the distance recorded in the segment information.

11. The method of claim 10, further comprising sending, to the following vehicle controlled by the sub lead vehicle, an identifier of the sub lead vehicle.

12. The method of claim 9, further comprising receiving the segment information from roadside equipment (RSE) or a control center.

13. The method of claim 9, further comprising sending vehicle platoon information to road side equipment (RSE) or a control center, wherein the vehicle platoon information comprises a speed, a location, and a vehicle spacing of the vehicle platoon.

14. The method of claim 13, wherein the vehicle platoon information further comprises a travelling route of the vehicle platoon, a weight of each vehicle in the vehicle platoon, and a length of each vehicle in the vehicle platoon.

15. The method of claim 9, further comprising receiving the segment information from roadside equipment (RSE).

16. The method of claim 9, further comprising receiving the segment information from a control center.

17. The method of claim 16, further comprising sending vehicle platoon information to the control center, wherein the vehicle platoon information comprises a speed, a location, and a vehicle spacing of the vehicle platoon.

18. A method for controlling a vehicle platoon, wherein the method is implemented by a first vehicle in the vehicle platoon, and wherein the method further comprises:
receiving a notification message from a lead vehicle in the vehicle platoon, wherein the notification message comprises indication information indicating that a control right is granted to the first vehicle as a sub lead vehicle and indicate a distance between the sub lead vehicle and a previous vehicle of the sub lead vehicle in the vehicle platoon, and wherein the sub lead vehicle is the first vehicle at a corresponding segment of the vehicle platoon;
controlling, based on the notification message, travelling of a following vehicle in the corresponding segment; and
keeping the distance from the previous vehicle of the sub lead vehicle in the vehicle platoon.

19. The method of claim 18, further comprising sending a travelling route, a speed, a location, a vehicle spacing, a weight of the first vehicle, and a length of the first vehicle.

20. The method of claim 18, wherein the first vehicle is within a preset distance of the vehicle platoon.

* * * * *